US012756658B2

(12) United States Patent
Dong et al.

(10) Patent No.: US 12,756,658 B2

(45) Date of Patent: Oct. 6, 2026

(54) METHOD FOR ADVERTISING PROCESSING CAPABILITY OF NETWORK DEVICE, DEVICE, AND SYSTEM

(71) Applicant: HUAWEI TECHNOLOGIES CO., LTD., Shenzhen (CN)

(72) Inventors: Lin Dong, Beijing (CN); Xinjun Chen, Nanjing (CN); Yaqun Xiao, Beijing (CN); Zhenxing Wang, Beijing (CN); Sheng Fang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 528 days.

(21) Appl. No.: 18/320,536

(22) Filed: May 19, 2023

(65) Prior Publication Data

US 2023/0300065 A1    Sep. 21, 2023

Related U.S. Application Data

(63) Continuation of application No. PCT/CN2021/132270, filed on Nov. 23, 2021.

(30) Foreign Application Priority Data

Nov. 23, 2020 (CN) ......................... 202011323142.3
Dec. 31, 2020 (CN) ......................... 202011638007.8

(51) Int. Cl.
*H04L 45/24* (2022.01)
*H04L 12/66* (2006.01)
(Continued)

(52) U.S. Cl.
CPC .............. *H04L 45/24* (2013.01); *H04L 12/66* (2013.01); *H04L 45/04* (2013.01); *H04L 45/28* (2013.01)

(58) Field of Classification Search
None
See application file for complete search history.

(56) References Cited

U.S. PATENT DOCUMENTS 9,225,592 B2 12/2015 Bashandy
12,244,495 B2 * 3/2025 Andhe .................... H04L 47/34
(Continued)

FOREIGN PATENT DOCUMENTS

CN 107872383 A 4/2018
WO 2020181992 A1 9/2020

OTHER PUBLICATIONS

Ahmed Abdelsalam et al:"SERA: SEgment Routing Aware Firewall for Service Function Chaining scenarios." May 14, 2018, total 9 pages.

(Continued)

*Primary Examiner* — Xavier S Wong

(74) *Attorney, Agent, or Firm* — WOMBLE BOND DICKINSON (US) LLP

(57) ABSTRACT

A method for advertising a processing capability of a network device, a system, and a network device are disclosed, and relate to the field of communication technologies. The method is performed by a network device, and includes: generating a advertisement message including indication information, where the indication information is used to indicate a processing capability of the network device, the processing capability of the network device includes a processing capability of ignoring secondary path information included in a packet when the network device serves as a network device on a primary path for forwarding the packet and receives the packet including primary path information and the secondary path information, and the (Continued)

secondary path information is used to indicate one or more secondary paths for forwarding the packet when the primary path is unavailable.

20 Claims, 10 Drawing Sheets

(51) Int. Cl.
*H04L 45/02* (2022.01)
*H04L 45/28* (2022.01)

(56) References Cited

U.S. PATENT DOCUMENTS

| | | | | |
|---|---|---|---|---|
| 2009/0225592 | A1 | 9/2009 | Lau et al. | |
| 2011/0122764 | A1* | 5/2011 | Ramakrishnan | H04L 41/0816 370/223 |
| 2020/0366599 | A1* | 11/2020 | Kaplan | H04L 45/28 |
| 2022/0231906 | A1* | 7/2022 | He | H04L 43/0805 |

OTHER PUBLICATIONS

Z. Hu et al:"SRv6 Path Egress Protection draft-ietf-rtgwg-srv6-egress-protection-01." Jul. 28, 2020, total 14 pages.

* cited by examiner

METHOD FOR ADVERTISING PROCESSING CAPABILITY OF NETWORK DEVICE, DEVICE, AND SYSTEM

CROSS-REFERENCE TO RELATED APPLICATIONS

This application is a continuation of International Application No. PCT/CN2021/132270, filed on Nov. 23, 2021, which claims priority to Chinese Patent Application No. 202011323142.3, filed on Nov. 23, 2020 and Chinese Patent Application No. 202011638007.8, filed on Dec. 31, 2020. All of the aforementioned patent applications are hereby incorporated by reference in their entireties.

TECHNICAL FIELD

This application relates to the field of communication technologies, and in particular, to a method for advertising a processing capability of a network device, a device, and a system.

BACKGROUND

To ensure continuity and robustness of transmission of service traffic in a data bearer network, a protection policy usually needs to be deployed for a key node included in a traffic transmission path, to avoid a service interruption directly caused when the key node is faulty. A scenario in which a bearer tunnel of virtual private network (VPN) service traffic is constructed by using a segment routing over Internet Protocol version 6 (SRv6) technology is used as an example. A remote provider edge (PE) device for connecting to a user-side device may be faulty when serving as a primary egress node of the tunnel. To cope with the fault scenario, egress protection needs to be deployed. In the SRv6 technology, a segment identifier (SID) list is used to indicate a packet forwarding path. Therefore, a SID of a secondary egress node may be added to a to-be-sent traffic packet. In this case, when finding that the primary egress node is faulty, a previous-hop node directly connected to the primary egress node may guide, by using the SID of the secondary egress node carried in a packet header, the traffic packet to be forwarded via the secondary egress node. The SRv6 technology also supports a service chain scenario. During typical application of a service chain, a service such as traffic cleaning or antivirus may be provided for the service traffic. To implement the foregoing service, the service traffic needs to pass through a service device such as a firewall in a forwarding process, and is sent to the user-side device along a subsequent forwarding path after the service device provides a corresponding service. However, the firewall device providing the service may also be faulty. To ensure use security of the transmitted service traffic, a backup device that may be used to replace the firewall to provide the service may alternatively be disposed, and the backup device may be indicated by a secondary device SID added to the packet of the service traffic.

In the foregoing application scenarios, in the SID list, a secondary SID used to indicate the secondary device is usually placed after a SID used to indicate a primary device. If the primary device is faulty, the secondary SID may be read according to a general rule, specified in SRv6, for processing the SID list, to forward the traffic packet. However, when the primary device is not faulty, the traffic packet is still sent to the primary device for forwarding. In this case, if the processing is still performed according to the general rule, an error may occur, and consequently, the traffic packet is discarded.

SUMMARY

This application provides a method for advertising a processing capability of a network device, a system, an apparatus, and a network device. A first network device that needs to advertise a processing capability of the first network device may send a advertisement message carrying indication information, where the indication information can indicate whether the first network device has a processing capability of ignoring secondary path information included in a packet when the first network device serves as a network device on a primary path for forwarding the packet and receives the packet including primary path information and the secondary path information. When determining that the first network device has the processing capability, a second network device receiving the advertisement message can send a service packet including the primary path information and the secondary path information to the first network device. This ensures that when the primary path can be used normally, the first network device can ignore the secondary path information that does not need to be used in the service packet, to avoid a problem such as a packet loss or incorrect forwarding caused by inappropriate processing of the secondary path information. Technical solutions provided in this application include at least the following embodiments.

In some embodiments, a method for advertising a processing capability of a network device is provided, and is performed by a first network device. The method includes: generating a advertisement message, where the advertisement message includes first indication information, the first indication information is used to indicate a processing capability of the first network device, the processing capability of the first network device includes a processing capability of ignoring secondary path information when the first network device serves as a network device on a primary path for forwarding a packet and receives the packet including primary path information and the secondary path information, and the secondary path information is used to indicate one or more secondary paths for forwarding the packet when the primary path is unavailable; and sending, by the first network device, the advertisement message to a second network device.

A type of the advertisement message and a manner of carrying the first indication information in the advertisement message may vary based on a network architecture and an application scenario that are used to implement the method. For example, the advertisement message may be a border gateway protocol (BGP) message, a BGP link state (BGP-LS) message, an interior gateway protocol (IGP) message, or the like for advertising a route.

Different message types may be used in different scenarios. For example, in a scenario A, a tunnel egress device may advertise a tunnel ingress device of a processing capability of the tunnel egress device by using the BGP message for advertising a route, so that when determining that the tunnel egress device has the processing capability, the tunnel ingress device adds secondary path information for protecting the tunnel egress device to a packet, to ensure that the tunnel egress device can perform adaptive processing on the secondary path information included in the received packet when the tunnel egress device is not faulty. For another example, in a scenario B, any network device on a packet forwarding path may advertise a controller of a processing capability of the network device by using the BGP-LS message, so that when determining that the corresponding network device has the processing capability, the controller orchestrates secondary path information associated with the network device, to protect the network device or a service associated with the network device. In this way, when a primary path on which the network device is located is not faulty, the network device can perform adaptive processing on the secondary path information included in the received packet.

The adaptive processing performed on the secondary path information is ignoring the secondary path information. A case of ignoring processing may be that the first network device ignores the secondary path information, and does not use the secondary path information to guide packet forwarding, or may be that the first network device ignores the secondary path information and can normally process the packet, for example, allowed to strip a packet header off the packet when the secondary path information is included. There may be a plurality of operation manners for implementing ignoring, and an operation manner may be determined with reference to an application scenario. For example, the ignoring manner may be removing, and the removing may be removing the secondary path information by stripping the entire packet header. This manner is applicable to the scenario A. As a tunnel egress node connected to a user-side device, after primary path information included in the packet header is matched, the first network device may completely strip the packet header off the packet, and complete subsequent forwarding from the first network device to the user-side device by using private network information carried in a payload part of the packet. For another example, the ignoring manner may be skipping, where the skipping may be skipping the second path information directly without reading the secondary path information, or skipping the second path information in an ignorable manner without using the secondary path information to guide forwarding although the secondary path information is read. If an associated device that needs to provide secondary path protection is an intermediate network device on the forwarding path, when determining to use the primary path to forward the packet, the intermediate network device may use the primary path information to perform subsequent forwarding, and needs to skip the secondary path information part carried in the packet because the secondary path is not used, to avoid a packet forwarding error.

Performing ignoring does not mean that the first network device does not perform any operation on the secondary path information. For example, in embodiments, the first network device may first read the secondary path information, and ignore the secondary path information in a skipping manner.

That the primary path is unavailable may mean that the primary path is unavailable because a node or a link on the primary path is faulty, or may mean that the primary path is unavailable because quality of service of the primary path cannot meet a requirement.

The secondary path information may be used to indicate one or more secondary paths. For example, the secondary path information is one or more secondary SIDs. One secondary SID may indicate one secondary path, or a secondary SID list including a plurality of SIDs may indicate one secondary path. When there are a plurality of available secondary paths, the secondary path information may include a plurality of secondary SIDs or a secondary SID list respectively corresponding to the plurality of secondary paths. An arrangement sequence of the plurality of secondary SIDs or the secondary SID list in the packet header may be used to determine a sequence of using the plurality of secondary paths when the primary path is unavailable.

In this solution, the first network device can send the advertisement message carrying the indication information, where the indication information can indicate whether the first network device has the processing capability of ignoring the secondary path information included in the packet when the first network device serves as the network device on the primary path for forwarding the packet and receives the packet including the primary path information and the secondary path information, so that when determining that the first network device has the processing capability, the network device receiving the advertisement message can send or indicate another network device to send a service packet including the primary path information and the secondary path information to the first network device. Therefore, when the primary path can be used normally, the first network device can ignore the secondary path information that does not need to be used in the service packet, to ensure network running robustness and avoid a problem of a packet loss or incorrect forwarding caused by inappropriate processing on the secondary path information.

In some embodiments, the method further includes: receiving a first packet, where the first packet includes first primary path information and first secondary path information, the first primary path information is used to indicate a first primary path for forwarding the first packet, and the first secondary path information is used to indicate one or more first secondary paths for forwarding the first packet when the first primary path is unavailable; and ignoring the first secondary path information, and forwarding the first packet based on the first primary path information.

After the first network device advertises the second network device of the processing capability of the first network device by using the message, if the second network device determines that the first network device has the processing capability, the second network device may send the first packet, or the second network device may indicate another network device to send the first packet. For example, when the second network device is a tunnel ingress device, the second network device may send the first packet. For another example, when the second network device is a controller having a service orchestration function, the controller may send the message including the primary path information and the secondary path information to a tunnel ingress device, and the tunnel ingress device sends the first packet including the primary path information and the secondary path information. That is, the first packet may be received from the second network device, or may be received from the another network device.

The first network device advertises the processing capability of the first network device in advance. Therefore, when receiving the first packet including the first primary path information and the first secondary path information, the first network device can ignore the first secondary path information that does not need to be used in the first packet, to ensure normal forwarding of the first packet.

In some embodiments, the first indication information is carried in a VPN route or a public route included in the BGP message, and the VPN route or the public route is a route for forwarding a service to which the packet belongs. The first network device may include the indication information for advertising the processing capability of the first network device in the VPN route or the public route advertised by the first network device for sending. The VPN route or the public route may include path information. After determining, based on the indication information, whether the first network device has the processing capability, the second network device receiving the VPN route or the public route may send, based on a determined situation, the path information carried in the route as the primary path information or the secondary path information in the sent packet.

In some embodiments, the first network device is an egress network device bearing the service, the VPN route is a virtual private network (VPN) route, and the first indication information is carried in a first virtual private network segment identifier (VPN SID) label field of the VPN route.

In some embodiments, the first indication information is carried in an extended community attribute in the BGP message.

The indication information is carried in the route. In this way, the first network device can cooperate with an existing mechanism to advertise the processing capability and advertise the path information in an associated manner, so that use compatibility and execution efficiency of this solution in this application are improved.

In some embodiments, the first network device may not be a device that initially generates a BGP message based on a route that needs to be advertised, but a device that receives the BGP message and generates the BGP message by modifying information in the BGP message.

In some embodiments, the generating a BGP message includes: receiving a BGP message that is not updated, where the BGP message that is not updated includes a second VPN SID label field of the VPN route; and replacing the second VPN SID label field with the first VPN SID label field, to generate the BGP message through updating.

In some embodiments, the second VPN SID label field includes second indication information used to indicate a processing capability of a third network device, the processing capability of the third network device includes a processing capability of ignoring the secondary path information included in the packet when the third network device serves as a network device on the primary path for forwarding the packet and receives the packet including the primary path information and the secondary path information, and the third network device is a network device indicated in next hop information carried in the BGP message that is not updated.

In some embodiments, the method further includes: receiving a BGP message that is not updated, where the BGP message that is not updated includes a next hop attribute, where both the first indication information in the extended community attribute and the next hop attribute include first next hop information, and the first next hop information is used to indicate a third network device.

In some embodiments, the method further includes: modifying the first next hop information in the second extended community attribute to second next hop information, to generate the BGP message through updating, where the second next hop information is used to indicate the first network device.

In some embodiments, the generating the BGP message through updating further includes: modifying the first next hop information in the extended community attribute to the second next hop information.

In some embodiments, that the first indication information is used to indicate a processing capability of the first network device includes: the first indication information and the next hop attribute are used to indicate the processing capability of the first network device.

In a scenario in which a next hop of a route needs to be modified, for example, in an inter-domain scenario, indication information updated in the route is used to indicate whether a network device (for example, when the first network device serves as a domain border device) identified by a modified next hop carried in the route has a processing capability, to ensure that when a primary path is available in the cross-domain scenario, the first network device can ignore secondary path information, so that a packet can be forwarded or processed normally.

In some embodiments, the VPN route or the public route included in the BGP message carries a SID, and the SID is used in the secondary path information carried in the packet received by the first network device.

In some embodiments, the secondary path information includes one or more secondary path labels, and the one or more secondary paths are indicated by the one or more secondary path labels. In some embodiments, the path label includes a SID.

When the secondary path information includes one or more secondary SIDs, the solution provided in this application may be applied to an SRv6 network or a segment routing-multiprotocol label switching (SR-MPLS) network.

In some embodiments, the one or more secondary SIDs are SIDs allocated by one or more network devices having a multi-homing relationship with the first network device. The one or more secondary SIDs may be separately carried in a route advertised by the one or more network devices for advertisement.

In some embodiments, the first secondary path information includes one or more secondary SIDs, the first primary path information includes a primary SID, and the primary SID is associated with the first network device; and the ignoring the first secondary path information, and forwarding the first packet based on the first primary path information includes: removing the one or more secondary SIDs by matching the primary SID with a SID stored in the first network device; and forwarding the first packet to a user-side network device based on payload information carried in the first packet, or forwarding the first packet based on a SID added after the one or more secondary SIDs are removed.

In some embodiments, the first secondary path information includes one or more secondary SIDs, the first primary path information includes a primary SID, and the primary SID is associated with the first network device; and the ignoring the first secondary path information, and forwarding the first packet based on the first primary path information includes: skipping the one or more secondary SIDs by matching the primary SID with a SID stored in the first network device, and forwarding the first packet based on a SID located after the one or more secondary SIDs.

In some embodiments, the first network device is an intermediate network device or an egress network device that bears a service, and the first indication information is carried in the IGP message or the BGP message for advertising a link state. The egress network device may be an egress network device of an end-to-end tunnel or an egress network device of a multi-segmented tunnel.

In some embodiments, the second network device is a controller or an ingress network device bearing the service.

In some embodiments, a method for advertising a processing capability of a network device is provided, and is performed by a second network device. The method includes: receiving a advertisement message sent by a first network device, where the advertisement message includes first indication information, the first indication information is used to indicate a processing capability of the first network device, the processing capability of the first network device includes a processing capability of ignoring secondary path information when the first network device serves as a network device on a primary path for forwarding a packet and receives the packet including primary path information and the secondary path information, and a secondary path is one or more secondary paths for forwarding the packet when the primary path is unavailable; and determining, based on the first indication information, that the first network device has the processing capability; or determining, based on the first indication information, that the first network device does not have the processing capability.

In this solution, after receiving the advertisement message that carries the indication information and that is sent by the first network device, the second network device can determine, based on the indication information, whether the first network device has the processing capability. In some application scenarios, when determining that the first network device has the processing capability and serves as the network device on the primary path for forwarding the packet, the second network device sends or indicates another network device (such as a tunnel ingress device) to send the packet including the primary path information and the secondary path information to the first network device, so that when the primary path can be used normally, the first network device can ignore the secondary path information that does not need to be used in the service packet, to ensure network running robustness and avoid a problem of a packet loss or incorrect forwarding caused by inappropriate processing on the secondary path information.

In some embodiments, the method further includes: sending a first packet based on the fact that the first network device has the processing capability, where the first packet carries first secondary path information and first primary path information, the first primary path information is used to indicate a first primary path for forwarding the first packet, and the first secondary path information is used to indicate one or more first secondary paths for forwarding the first packet when the first primary path is unavailable; or sending a first message to a third network device based on the fact that the first network device has the processing capability, where the first message is used to indicate the third network device to obtain, based on the first message, first secondary path information and first primary path information that are carried in a first packet, and the first packet is a packet sent by the third network device to the first network device.

In some embodiments, the determining, based on the first indication information, that the first network device has the processing capability includes: determining, based on the fact that the advertisement message sent by the first network device carries the first indication information, that the first network device has the processing capability. In some embodiments, it is determined, based on the fact that the first indication information carried in the advertisement message sent by the first network device has a first value, that the first network device has the processing capability.

In some embodiments, the advertisement message sent by the first network device is a BGP message or an IGP message.

In some embodiments, the first indication information is carried in a VPN route or a public route included in the BGP message, and the VPN route or the public route is a route for forwarding a service to which the packet belongs.

In some embodiments, the first indication information is carried in the VPN route in the BGP message, and the determining, based on the first indication information, that the first network device has the processing capability includes: determining, based on the fact that the VPN route includes the first indication information, that the first network device has the processing capability.

In some embodiments, the first indication information is carried in an extended community attribute in the BGP message.

In some embodiments, the BGP message further includes a next hop attribute, and the next hop attribute carries next hop information used to indicate the first network device; and the determining, based on the first indication information, that the first network device has the processing capability includes: determining, based on the fact that the first indication information is the same as the next hop information carried in the next hop attribute, that the first network device has the processing capability; or the determining, based on the first indication information, that the first network device does not have the processing capability includes: determining, based on the fact that the first indication information is different from the next hop information carried in the next hop attribute, that the first network device does not have the processing capability.

In some embodiments, before the sending a first packet, the method further includes: receiving a advertisement message sent by a fourth network device, where the advertisement message sent by the fourth network device includes second indication information, the second indication information is used to indicate a processing capability of the fourth network device, the processing capability of the fourth network device includes a processing capability of ignoring the secondary path information included in the packet when the fourth network device serves as a network device on the primary path for forwarding the packet and receives the packet including the primary path information and the secondary path information, and the secondary path information is used to indicate the one or more secondary paths for forwarding the packet when the primary path is unavailable.

In this solution, the second network device can separately receive a plurality of advertisement messages from a plurality of network devices for packet forwarding. In this way, processing capabilities of the plurality of network devices may be separately determined based on the plurality of advertisement messages, and one network device having the processing capability in the network devices is determined as the primary device based on the processing capabilities of the plurality of network devices, so that flexibility and reliability of using this solution are improved.

In some embodiments, the advertisement message sent by the first network device further includes first path information, the advertisement message sent by the fourth network device further includes second path information, and before sending the first packet or the first message to the first network device, the method further includes: determining, based on the advertisement message sent by the first network device and the advertisement message sent by the fourth network device, that the first network device is a primary device and the fourth network device is a secondary device; and adding the first path information and the second path information to generate the first packet, where the first path information belongs to the first primary path information, and the second path information belongs to the first secondary path information; or sending the first message including the first path information and the second path information to the third network device, to indicate the third network device to include the first path information and the second path information in the first packet, where the first path information belongs to the first primary path information, and the second path information belongs to the first secondary path information.

In some embodiments, the first path information includes a first VPN SID label allocated by the first network device, and the second path information includes a second VPN SID label allocated by the fourth network device.

In some embodiments, the method further includes: sending a second packet based on the fact that the first network device does not have the processing capability, where the second packet carries second primary path information but does not carry second secondary path information, the second primary path information is used to indicate a second primary path for forwarding the second packet, and the second secondary path information is used to indicate one or more second secondary paths for forwarding the second packet when the second primary path is unavailable.

In this solution, when determining that the first network device does not have the processing capability, the second network device may send or indicate another network device to send a packet that does not include the secondary path information, to at least ensure normal forwarding or processing of the packet in a scenario in which the primary path is not faulty.

In some embodiments, the first network device is an egress network device of a tunnel or an intermediate network device of the tunnel, and the second network device is a controller or an ingress network device of the tunnel.

In some embodiments, the first network device is an egress network device of a first tunnel between the first network device and the second network device, the fourth network device is an egress network device of a second tunnel between the fourth network device and the second network device, and the second network device is an ingress network device of the first tunnel and the second tunnel.

In some embodiments, the first tunnel and the second tunnel each are an SRv6 tunnel or an SR-MPLS tunnel.

In some embodiments, this application provides an apparatus for advertising a processing capability of a network device. The apparatus may include a functional unit configured to perform the method for advertising a processing capability of a network device according to embodiments disclosed herein.

For example, the apparatus may include a generation unit and a sending unit. The generation unit is configured to generate a advertisement message, where the advertisement message includes first indication information, the first indication information is used to indicate a processing capability of a first network device, the processing capability of the first network device includes a processing capability of ignoring secondary path information when the first network device serves as a network device on a primary path for forwarding a packet and receives the packet including primary path information and the secondary path information, and the secondary path information is used to indicate one or more secondary paths for forwarding the packet when the primary path is unavailable. The sending unit is configured to send the advertisement message to a second network device.

In this solution, the first network device can send the advertisement message carrying the indication information, where the indication information can indicate whether the first network device has the processing capability of ignoring the secondary path information included in the packet when the first network device serves as the network device on the primary path for forwarding the packet and receives the packet including the primary path information and the secondary path information, so that when determining that the first network device has the processing capability, the network device receiving the advertisement message can send or indicate another network device to send a service packet including the primary path information and the secondary path information to the first network device. Therefore, when the primary path can be used normally, the first network device can ignore the secondary path information that does not need to be used in the service packet, to ensure network running robustness and avoid a problem of a packet loss or incorrect forwarding caused by inappropriate processing on the secondary path information.

In some embodiments, the apparatus further includes a receiving unit and a forwarding unit. The receiving unit is configured to receive a first packet sent by the second network device, where the first packet includes first primary path information and first secondary path information, the first primary path information is used to indicate a first primary path for forwarding the first packet, and the first secondary path information is used to indicate one or more first secondary paths for forwarding the first packet when the first primary path is unavailable. The forwarding unit is configured to: ignore the first secondary path information, and forward the first packet based on the first primary path information.

In some embodiments, the advertisement message is a border gateway protocol BGP message or an interior gateway protocol IGP message.

In some embodiments, the first indication information is carried in a VPN route or a public route included in the BGP message, and the VPN route or the public route is a route for forwarding a service to which the packet belongs.

In some embodiments, the first network device is an egress network device bearing the service, the VPN route is a VPN route, and the first indication information is carried in a first virtual private network segment identifier VPN SID label field of the VPN route.

In some embodiments, the receiving unit is further configured to: receive a BGP message that is not updated, where the BGP message that is not updated includes a second VPN SID label field of the VPN route; and replace the second VPN SID label field with the first VPN SID label field, to generate the BGP message through updating.

In some embodiments, the second VPN SID label field includes second indication information used to indicate a processing capability of a third network device, the processing capability of the third network device includes a processing capability of ignoring the secondary path information included in the packet when the third network device serves as a network device on the primary path for forwarding the packet and receives the packet including the primary path information and the secondary path information, and the third network device is a network device indicated in next hop information carried in the BGP message that is not updated.

In some embodiments, the first indication information is carried in an extended community attribute in the BGP message.

In some embodiments, before the BGP message is generated, the receiving unit is further configured to receive a BGP message that is not updated, where the BGP message that is not updated includes a next hop attribute, where both the first indication information in the extended community attribute and the next hop attribute include first next hop information, and the first next hop information is used to indicate a third network device.

In some embodiments, the generating a BGP message includes: modifying the first next hop information in the next hop attribute to second next hop information, to generate the BGP message through updating, where the second next hop information is used to indicate the first network device.

In some embodiments, the generating the BGP message through updating further includes: modifying the first next hop information in the extended community attribute to the second next hop information.

In some embodiments, that the first indication information is used to indicate a processing capability of the first network device includes: the first indication information and the second extended community attribute are used to indicate the processing capability of the first network device.

In some embodiments, the VPN route or the public route included in the BGP message carries a SID, and the SID is used in the secondary path information carried in the packet received by the first network device.

In some embodiments, the secondary path information includes one or more secondary path labels, and the one or more secondary paths are indicated by the one or more secondary path labels. In some embodiments, the path label includes a SID.

In some embodiments, the one or more secondary SIDs are SIDs allocated by one or more network devices having a multi-homing relationship with the first network device.

In some embodiments, the first secondary path information includes one or more secondary SIDs, the first primary path information includes a primary SID, and the primary SID is associated with the first network device. The forwarding unit is further configured to: remove the one or more secondary SIDs by matching the primary SID with a SID stored in the first network device; and forward the first packet to a user-side network device based on payload information carried in the first packet, or forward the first packet based on a SID added after the one or more secondary SIDs are removed.

In some embodiments, the first secondary path information includes one or more secondary SIDs, the first primary path information includes a primary SID, and the primary SID is associated with the first network device. The forwarding unit is further configured to: ignore the one or more secondary SIDs by matching the primary SID with a SID stored in the first network device, and forward the first packet based on a SID located after the one or more secondary SIDs.

In some embodiments, the first network device is an intermediate network device or an egress network device that bears a service, and the first indication information is carried in the IGP message or the BGP message for advertising a link state.

In some embodiments, the second network device is a controller or an ingress network device bearing the service.

In some embodiments, this application provides an apparatus for advertising a processing capability of a network device. The apparatus may include a functional unit configured to perform the method for advertising a processing capability of a network device according to embodiments disclosed herein.

For example, the apparatus may include a receiving unit and a determining unit. The receiving unit is configured to receive a advertisement message sent by a first network device, where the advertisement message includes first indication information, the first indication information is used to indicate a processing capability of the first network device, the processing capability of the first network device includes a processing capability of ignoring secondary path information when the first network device serves as a network device on a primary path for forwarding a packet and receives the packet including primary path information and the secondary path information, and a secondary path is one or more secondary paths for forwarding the packet when the primary path is unavailable. The determining unit is configured to: determine, based on the first indication information, that the first network device has the processing capability; or determine, based on the first indication information, that the first network device does not have the processing capability.

In this solution, after receiving the advertisement message that carries the indication information and that is sent by the first network device, a second network device can determine, based on the indication information, whether the first network device has the processing capability. In some application scenarios, when determining that the first network device has the processing capability and serves as the network device on the primary path for forwarding the packet, the second network device sends or indicates another network device (such as a tunnel ingress device) to send the packet including the primary path information and the secondary path information to the first network device, so that when the primary path can be used normally, the first network device can ignore the secondary path information that does not need to be used in the service packet, to ensure network running robustness and avoid a problem of a packet loss or incorrect forwarding caused by inappropriate processing on the secondary path information.

In some embodiments, the apparatus further includes a sending unit. The sending unit is configured to send: a first packet based on the fact that the first network device has the processing capability, where the first packet carries first secondary path information and first primary path information, the first primary path information is used to indicate a first primary path for forwarding the first packet, and the first secondary path information is used to indicate one or more first secondary paths for forwarding the first packet when the first primary path is unavailable; or send a first message to a third network device based on the fact that the first network device has the processing capability, where the first message is used to indicate the third network device to obtain, based on the first message, first secondary path information and first primary path information that are carried in a first packet, and the first packet is a packet sent by the third network device to the first network device.

In some embodiments, the determining unit is further configured to determine, based on the fact that the advertisement message sent by the first network device carries the first indication information, that the first network device has the processing capability. In some embodiments, it is determined, based on the fact that the first indication information carried in the advertisement message sent by the first network device has a first value, that the first network device has the processing capability.

In some embodiments, the advertisement message sent by the first network device is a BGP message or an IGP message.

In some embodiments, the first indication information is carried in a VPN route or a public route included in the BGP message, and the VPN route or the public route is a route for forwarding a service to which the packet belongs.

In some embodiments, the first indication information is carried in the VPN route in the BGP message, and that the determining unit determines, based on the first indication information, that the first network device has the processing capability includes: determining, based on the fact that the VPN route includes the first indication information, that the first network device has the processing capability.

In some embodiments, the first indication information is carried in an extended community attribute in the BGP message.

In some embodiments, the BGP message further includes a next hop attribute, and the next hop attribute carries next hop information used to indicate the first network device. That the determining unit determines, based on the first indication information, that the first network device has the processing capability includes: determining, based on the fact that the first indication information is the same as the next hop information carried in the next hop attribute, that the first network device has the processing capability; or that the determining unit determines, based on the first indication information, that the first network device does not have the processing capability includes: determining, based on the fact that the first indication information is different from the next hop information carried in the next hop attribute, that the first network device does not have the processing capability.

In some embodiments, before the first packet or the first message is sent, the receiving unit is further configured to receive a advertisement message sent by a fourth network device, where the advertisement message sent by the fourth network device includes second indication information, the second indication information is used to indicate a processing capability of the fourth network device, the processing capability of the fourth network device includes a processing capability of ignoring the secondary path information included in the packet when the fourth network device serves as a network device on the primary path for forwarding the packet, and the secondary path information is used to indicate the one or more secondary paths for forwarding the packet when the primary path is unavailable.

In some embodiments, the advertisement message sent by the first network device further includes first path information, the advertisement message sent by the fourth network device further includes second path information, and before the first packet or the first message is sent, the determining unit is further configured to determine, based on the advertisement message sent by the first network device and the advertisement message sent by the fourth network device, that the first network device is a primary device and the fourth network device is a secondary device. The apparatus further includes a generation unit. The generation unit is configured to add the first path information and the second path information to generate the first packet, where the first path information belongs to the first primary path information, and the second path information belongs to the first secondary path information. Alternatively, the sending unit sends the first message including the first path information and the second path information to the third network device, to indicate the third network device to include the first path information and the second path information in the first packet, where the first path information belongs to the first primary path information, and the second path information belongs to the first secondary path information.

In some embodiments, the first path information includes a first virtual private network segment identifier VPN SID label allocated by the first network device, and the second path information includes a second VPN SID label allocated by the fourth network device.

In some embodiments, after the determining unit determines, based on the first indication information, that the first network device does not have the processing capability, the sending unit is further configured to send a second packet based on the fact that the first network device does not have the processing capability, where the second packet carries second primary path information but does not carry second secondary path information, the second primary path information is used to indicate a second primary path for forwarding the second packet, and the second secondary path information is used to indicate one or more second secondary paths for forwarding the second packet when the second primary path is unavailable.

In some embodiments, the first network device is an egress network device of a tunnel or an intermediate network device of the tunnel, and the second network device is a controller or an ingress network device of the tunnel.

In some embodiments, the first network device is an egress network device of a first tunnel between the first network device and the second network device, the fourth network device is an egress network device of a second tunnel between the fourth network device and the second network device, and the second network device is an ingress network device of the first tunnel and the second tunnel.

In some embodiments, the first tunnel and the second tunnel each are an SRv6 tunnel or an SR-MPLS tunnel.

In some embodiments, a first network device is provided. The network device includes a processor. The processor invokes program instructions, to enable the network device to implement an operation performed in the method according to embodiments disclosed herein. The network device may further include a memory. The memory is coupled to the processor, and the program instructions invoked by the processor are stored in the memory. The network device may further include a communication interface. The communication interface is used by the device to communicate with another device. For example, the communication interface may be a transceiver, a circuit, a bus, a module, or a communication interface of another type. The program instructions invoked by the processor may alternatively be pre-stored in an external memory, and are downloaded from an internet before being used and then stored locally. A source of the instructions in the memory is not uniquely limited in this application.

In some embodiments, a second network device is provided. The network device includes a processor. The processor invokes program instructions, to enable the network device to implement an operation performed in the method according to embodiments disclosed herein. The network device may further include a memory. The memory is coupled to the processor, and the program instructions invoked by the processor are stored in the memory. The network device may further include a communication interface. The communication interface is used by the device to communicate with another device. For example, the communication interface may be a transceiver, a circuit, a bus, a module, or a communication interface of another type. The program instructions invoked by the processor may alternatively be pre-stored in an external memory, and are downloaded from an internet before being used and then stored locally. A source of the instructions in the memory is not uniquely limited in this application.

In some embodiments, a system for advertising a processing capability of a network device is provided. The system may include one or more network devices described herein.

In some embodiments, a chip system is provided. The chip system includes a processor and an interface circuit. The interface circuit is configured to receive instructions and transmit the instructions to the processor. The processor is configured to execute instructions corresponding to the method according to embodiments disclosed herein, or is configured to execute instructions corresponding to the method according to embodiments disclosed herein.

In some embodiments, a computer-readable storage medium is provided. The storage medium stores program code. The program code is loaded and executed by a processor, to enable a computer to implement an operation performed in the method according to embodiments disclosed herein, or enable the computer to implement an operation performed in the method according to embodiments disclosed herein.

In some embodiments, a computer program product or a computer program is provided. The computer program product or the computer program includes program code. When the computer program product or the computer program is run on a network device, the network device is enabled to perform the method according to embodiments disclosed herein, or the network device is enabled to perform the method according to embodiments disclosed herein.

BRIEF DESCRIPTION OF DRAWINGS

To describe technical solutions in embodiments of this application more clearly, the following briefly describes the accompanying drawings required for describing the embodiments. It is clear that the accompanying drawings in the following descriptions show merely some embodiments of this application, and a person of ordinary skill in the art may still derive other drawings from these accompanying drawings without creative efforts.

DESCRIPTION OF EMBODIMENTS

To make objectives, technical solutions, and advantages of this application clearer, the following further describes implementations of this application in detail with reference to the accompanying drawings.

To ensure normal forwarding of service traffic in a data bearer network, a policy for primary/secondary protection usually needs to be configured for a key node included in a traffic transmission path, to avoid a service interruption directly caused when the key node is faulty. In an SRv6 network, in a feasible manner of implementing primary/secondary protection of a node, both a primary SID pointing to a primary node and one or more secondary SIDs pointing to one or more secondary nodes may be included in a traffic packet, so that the secondary node forwards the traffic packet in a scenario in which the primary node is faulty. For ease of understanding, several application scenarios of implementing primary/secondary protection by using primary/secondary SIDs are first described in embodiments of the present disclosure.

Scenario 1: Egress Protection

In a scenario in which an SRv6 technology is used to carry a VPN service, if a egress node serving as an egress device of an SRv6 tunnel is faulty, service traffic cannot be finally forwarded to a user-side device via the egress node. As a result, the service is interrupted. To ensure successful forwarding of the service traffic in the foregoing case, a secondary egress node may be deployed to implement egress protection.

Figure 1A:
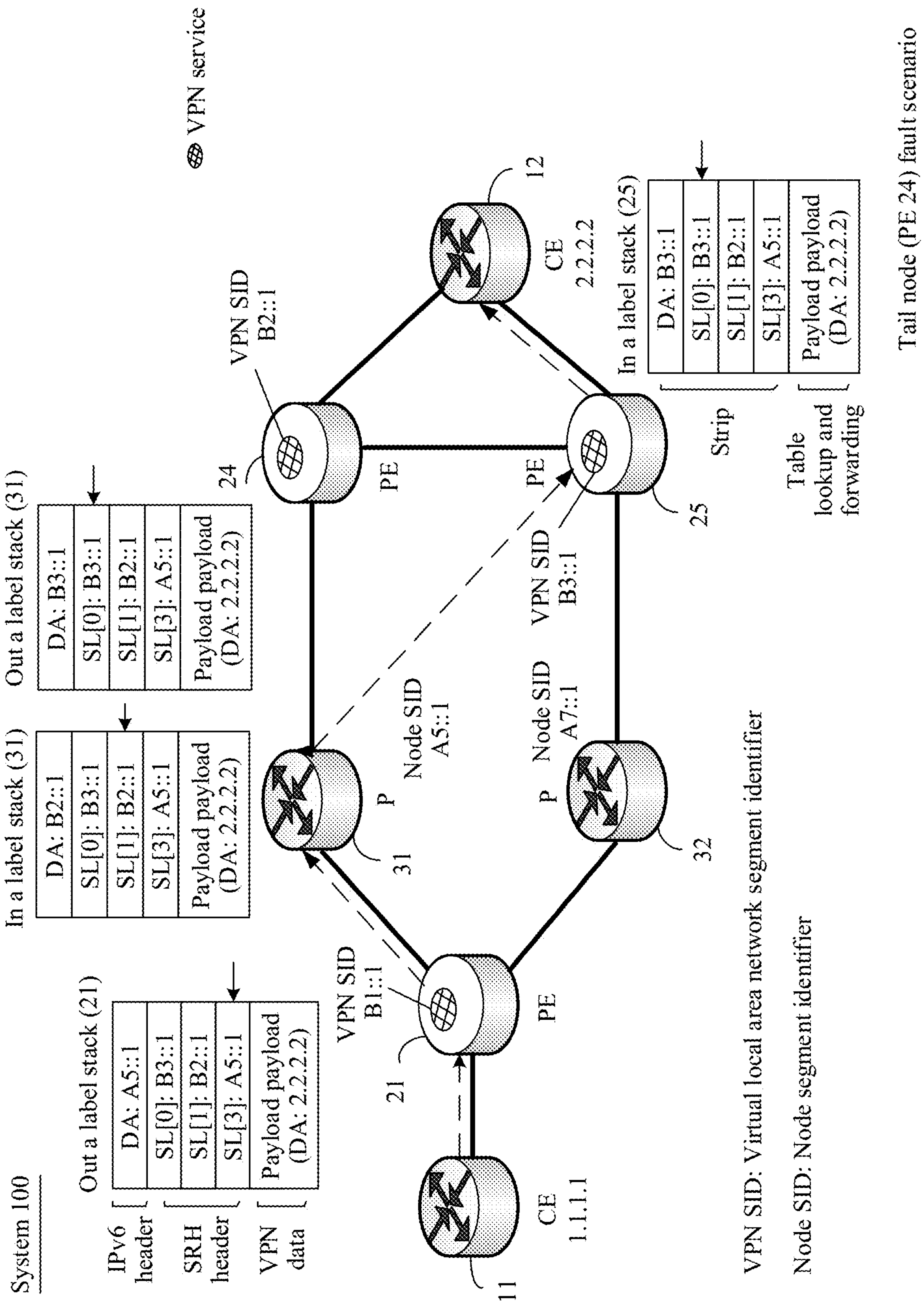
FIG. 1*a* is a schematic diagram of a structure of a network system for implementing service traffic forwarding according to an embodiment of this application.

FIG. 1*a* shows a system 100 for implementing service traffic forwarding in an SRv6 network according to an embodiment of the present disclosure. The system 100 may include the following devices: a customer edge (CE) 11, a CE 12, a provider edge (PE) 21, a PE 24, a PE 25, a provider (P) (backbone) 31, and a P 32. The CE 11 is connected to the PE 21, and the CE 12 is dual-homed to the PE 24 and the PE 25. The CE 11 and the CE 12 may be separately connected to a plurality of user hosts on a user side. The CE 11 or the CE 12 may be directly connected to the plurality of user hosts, or may be connected to the plurality of user hosts via another user-side network device. For example, the CE 11 forwards, to the CE 12, a service packet of a user host connected to the CE 11. In a normal forwarding scenario, the PE 21 may send the service packet to the PE 24 serving as a remote primary device, to forward the service packet to the CE 12 via the PE 24. However, in a scenario in which the PE 24 is faulty, when the service packet arrives at the P 31, the P 31 as a network device directly connected to the PE 24 may quickly sense that a route of the PE 24 is unreachable. In this case, if the P 31 can forward the service packet to the PE 25 in a manner, the PE 25 serves as a remote secondary PE that forms dual-homing devices with the PE 24, that is, may forward the service packet to the CE 12 when the PE 24 is faulty. In the foregoing descriptions, the device directly connected to the PE 24 senses the device fault, and directly adjusts an implementation of a packet forwarding path, to resolve a problem of a packet loss caused when the service packet cannot be normally forwarded in a scenario in which the PE 24 is faulty. Because a device that plays a role such as the PE 24 is usually located at an egress of a packet transmission tunnel, the mechanism described above may also be referred to as a egress protection mechanism.

In a feasible solution for implementing egress protection in the SRv6 network, an ingress node of the packet transmission tunnel may add an indication to path information for guiding packet forwarding, so that a previous-hop node on the path can forward the packet to a secondary node based on the indication when sensing a fault of a egress node. In this scenario, the ingress node may also be referred to as a head node. The system 100 shown in FIG. 1*a* is still used as an example. The PE 24 and the PE 25 separately learn a route that is advertised by the CE 12 and that is used to forward a packet of a VPN service, which is referred to as a VPN route for short herein. A destination address of the VPN route may be, for example, an address of a user host connected to the CE 12, or may be an address of a destination network segment connected to the CE 12. For example, the destination address of the VPN route is 2.2.2.2. The PE 24 allocates a VPN segment identifier (SID) B2::1 used to identify the VPN service, includes the VPN segment identifier B2::1 in the VPN route, and advertises the VPN route to the PE 21. Similarly, the PE 25 allocates a VPN SID B3::1 used to identify the VPN service, includes the VPN SID B3::1 in the VPN route, and advertises the VPN route to the PE 21. The PE 21 receives, from the CE 11, a service packet sent to the destination address 2.2.2.2, and adds packet header information to the service packet. The packet header information is used to guide forwarding of the service packet in a tunnel. The packet header information may include an internet protocol version 6 (IPv6) header and a segment routing header (SRH). To implement a egress protection function, the PE 21 adds, to a segment list (SL) included in the SRH, both the VPN SID B2::1 advertised by the PE 24 and the VPN SID B3::1 advertised by the PE 25, where B3::1 is located at a stack bottom closer to an SL label stack than B2::1. That is, when the service packet traverses the tunnel, B2::1 in the SL may be read earlier than B3::1. In this way, when the service packet arrives at the P 31, the P 31 first displays a SID label A5::1 from the label stack included in the received service packet, because A5::1 matches a node SID that is locally allocated and advertised by the P 31. Then, the P 31 reads a lower-layer label B2::1 of the label stack, where B2::1 is a VPN SID advertised by the primary device PE 24. If the PE 24 is faulty, the P 31 may quickly sense that a route of B2::1 is unreachable. In this case, the P 31 may skip the label, read a lower-layer label B3::1, and determine to forward the service packet to the PE 25 by searching for a route of B3::1. When the service packet arrives at the PE 25, because B3::1 is the stack bottom label of the label stack, the PE 25 may display the stack bottom label, and determine a corresponding VPN service based on the VPN SID B3::1, to complete a user-side forwarding procedure of the service packet in a VPN identified by B3::1.

Figure 1B:
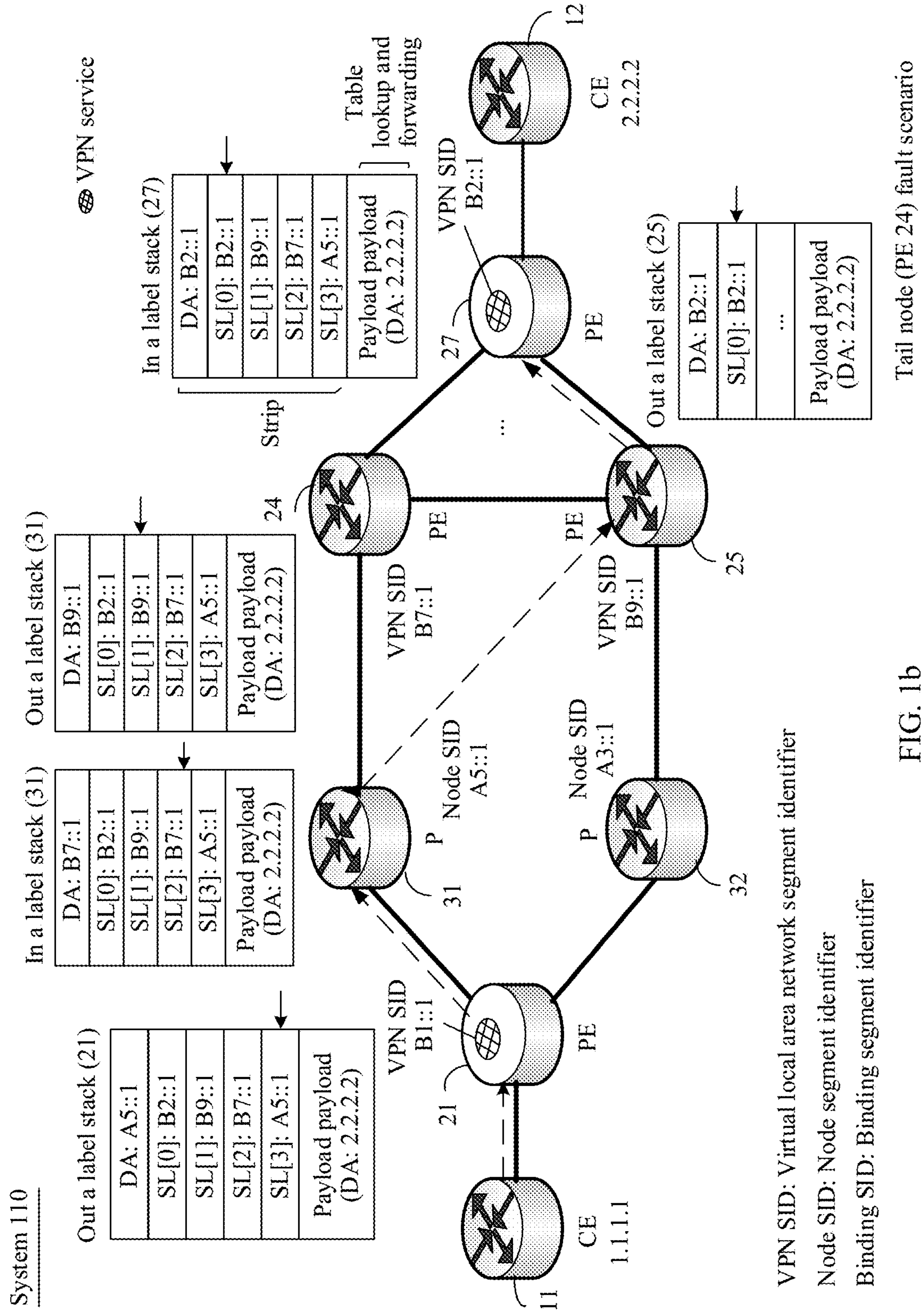
FIG. 1*b* is a schematic diagram of a structure of another network system for implementing service traffic forwarding according to an embodiment of this application.

FIG. 1*b* shows another system 110 for implementing service traffic forwarding in an SRv6 network according to an embodiment of the present disclosure. In this system, a PE 21, a PE 24, and a PE 25 are nodes in a same network domain, and the same network domain may be, for example, a same autonomous (AS) domain. In addition, the PE 24 and the PE 25, as domain border nodes, are connected to a node PE 27 in another AS domain, and the PE 27 is connected to a user-side network node CE 12, to communicate with a user host mounted to the CE 12. Because an inter-domain scenario is involved, in some embodiments, a tunnel A may be established between the PE 21 and the PE 24, and a tunnel B may be established between the PE 24 and the PE 27 (where FIG. 1*b* does not show one or more intermediate nodes included in the tunnel B). The tunnel A and the tunnel B may form an end-to-end tunnel from an ingress node PE 21 to an egress node PE 27. The tunnel A and the tunnel B each may be referred to as a multi-segmented tunnel. The PE 21 may also be referred to as a head node of the tunnel A, and the PE 24 may be referred to as a egress node of the tunnel A. The PE 27 advertises a VPN route with a destination address 2.2.2.2 to the PE 24 by using a BGP message. For the inter-domain scenario, in some embodiments, after receiving the BGP message, the PE 24 needs to modify a next hop attribute in the BGP message to a device identifier of the PE 24, for example, a loopback address or an interface internet protocol (IP) address of the PE 24. In some embodiments, when modifying next hop information in the BGP message, the PE 24 further reallocates a corresponding VPN SID B7::1 to the VPN route carried in the BGP message. After updating the BGP message, the PE 24 advertises an updated BGP message to the PE 21.

In a normal forwarding scenario, the PE 21 chooses to forward a packet to an inter-domain device PE 27 via the PE 24. If the PE 24 modifies a next hop in the BGP message and reallocates the VPN SID to the VPN route carried in the BGP message, the PE 21 senses that the PE 24 is a next hop device bearing a VPN service, instead of the PE 27. Therefore, the PE 21 adds, to an SL label stack, the VPN SID B7::1 allocated by the PE 24 to guide forwarding. When the packet arrives at the PE 24, the PE 24 may search, based on the fact that a SID value carried in a destination address (DA) field included in a packet header matches a value of a VPN SID stored locally in the PE 24, for a SID list corresponding to the VPN SID, and add the SID list to the packet header of the packet to guide subsequent forwarding of the packet in a next network domain. The SID list may include a plurality of SIDs, and the plurality of SIDs are used to indicate a forwarding path from the PE 24 to the PE 27.

To avoid a service traffic interruption caused when the egress node PE 24 is faulty, a backup device PE 25 of the PE 24 may be configured in the network. In this way, when the primary node PE 24 is faulty, the PE 25 serving as a secondary node forwards the service traffic on the user side to the PE 27, so that egress protection is implemented. To implement the foregoing function, the PE 21 as an ingress may add an indication to path information for guiding packet forwarding, so that a previous-hop node P 31 on a path can forward the packet to the secondary node PE 25 based on the indication when sensing the fault of the egress node. The PE 21 may add, to a segment list, a VPN SID B7::1 allocated and advertised by the PE 24 and a VPN SID B9::1 allocated and advertised by the PE 25, where B9::1 is located at a stack bottom closer to an SL label stack than B7::1. That is, when the service packet traverses the tunnel, B7::1 in the SL may be read earlier than B9::1. If the PE 24 is faulty, the P 31 may quickly sense that a route of B7::1 is unreachable. In this case, the P 31 may skip the label, read a lower-layer label B9::1, and determine to forward the service packet to the PE 25 by searching for a route of B9::1. When the service packet arrives at the PE 25, the PE 25 may search, based on B9::1, for a locally stored SID list corresponding to B9::1, and add the SID list to the path information for guiding packet forwarding, to indicate subsequent forwarding of the packet to the PE 27.

Scenario 2: Service Protection

Figure 2:
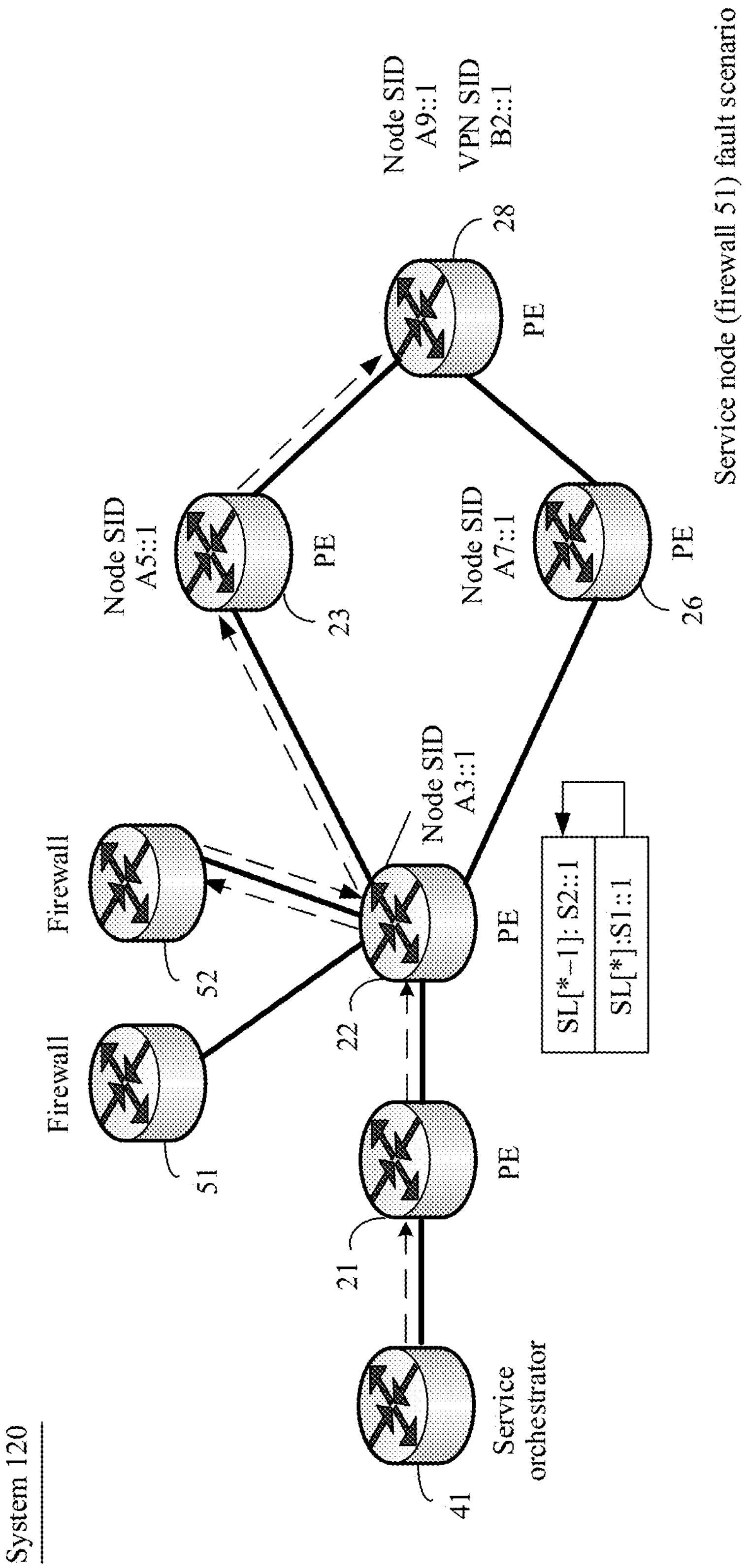
FIG. 2 is a schematic diagram of a structure of another network system for implementing service traffic forwarding according to an embodiment of this application.

FIG. 2 shows a system 120 for implementing a service chain in an SRv6 network according to an embodiment of the present disclosure. A service orchestrator 41 may obtain SIDs of various types advertised by PE nodes within a management domain range. For example, the service orchestrator 41 may obtain, from a PE 22, SIDs of service types, including S1::1 and S2::1, where S1::1 may be used to indicate the PE 22 to send a service packet to a firewall 51 for cleaning to implement attack filtering, and S2::1 is used to indicate the PE 22 to send the service packet to a firewall 52 for cleaning. That is, in a traffic cleaning scenario, S1::1 may be used to indicate a primary path for forwarding the packet, and S1::2 may be used to indicate a secondary path for forwarding the packet. For another example, the service orchestrator 41 may alternatively obtain a SID of a node type from a PE 23 or a PE 26, where A5::1 is used to indicate the PE 23, and A7::1 is used to indicate the PE 26. For another example, the service orchestrator 41 may alternatively obtain a SID (A9::1) of a node type or a SID (B2::1) of a VPN type from a PE 28. The service orchestrator 41 may use, based on a difference between services that need to be borne by the PE 28, a SID of a corresponding type to orchestrate a path. In a possible example, A9::1 may be used to guide forwarding of a public network service packet, and B2::1 may be used to guide forwarding of a private network VPN service packet.

In a normal forwarding scenario, the firewall 51 serving as a primary device provides a cleaning service for a traffic packet. However, to avoid a traffic interruption when the firewall 51 is faulty, the firewall 52 may also be deployed as a secondary device to provide the cleaning service. The service orchestrator 41 may orchestrate path information for forwarding traffic from the PE 21 to the PE 28, and send the orchestrated path information to a head node, to indicate the PE 21 to add the path information to the packet, to guide forwarding of the packet. In the SRv6 network, the path information may be an SL including a plurality of SIDs. To protect a service such as traffic cleaning, the service orchestrator 41 may add both S1::1 and S2::1 to the delivered path information. In this way, when the traffic packet is forwarded to the PE 22, and the PE 22 finds that the firewall 51 is faulty, the PE 22 may ignore S1::1 currently indicated in the SL, and read the next SID S2::1 in the SL, to guide, based on S2::1, the traffic packet to be forwarded to the firewall 52 for cleaning. After the cleaning is completed, the traffic packet may be returned to the PE 22, and forwarded to the PE 28 via the PE 23 based on an indication of a subsequent SID in the SL.

The foregoing scenarios 1 and 2 each mainly describe an execution manner in which a primary SID is skipped and a packet is forwarded based on a secondary path indicated by a next secondary SID when both the primary SID and the secondary SID are carried in the packet in the SRv6 network and a path indicated by the primary SID is faulty. It may be understood that the scenarios 1 and 2 are merely used as examples, and a similar execution manner is also applicable to another network architecture and application scenario. For example, a similar method may be applied to protect an intermediate node on a forwarding path. The network scenario shown in FIG. 2 is used as an example. If it is considered that the PE 22 connected to the firewall 51 capable of providing the cleaning service may also be faulty when traffic is cleaned, the cleaning service cannot be used for the traffic, and the traffic may be interrupted. In this case, a secondary PE node may be deployed for the PE 22, where the secondary PE node is also connected to a firewall capable of providing the cleaning service, so that when the PE 21 finds that the PE 22 serving as a primary node is faulty, the PE 21 may directly forward, based on a secondary SID of a service type that is orchestrated by the service orchestrator 41 and allocated by the secondary PE node, the traffic packet to the secondary PE node for cleaning. In this way, the intermediate node PE 22 is protected, and successful traffic cleaning is also ensured. For another example, in the scenarios 1 and 2, one secondary SID is used as the secondary path information. In another scenario, a plurality of optional secondary paths may also be provided by using a plurality of secondary SIDs as the secondary path information. Alternatively, the secondary path information is not necessarily in a form of a SID, but is a path label of another type, or is directly represented in another format. For another example, both the primary SID used to indicate the primary path and the secondary SID used to indicate the secondary path may be of various types. For example, a SID may be used to indicate a node on a path, may be used to indicate a link on a path, may be used to indicate a service, or may be used to indicate a path including a plurality of hops of nodes. For another example, in addition to being applied to node protection or service protection, the method may also be applied to another service scenario in which primary/secondary protection needs to be implemented. For another example, in addition to being applied to the SRv6 network, the similar execution manner may also be applied to a network of another type. In a possible case, when the SR technology is applied to a multiprotocol label switching (MPLS) data plane, the similar execution manner may be applied to a segment routing-MPLS (SR-MPLS) network. In the SRv6 network, the primary SID and the secondary SID may be encapsulated into an SRH of an IPv6 extension header. In the SR-MPLS network, the primary SID and the secondary SID may be encapsulated into an MPLS packet header.

In the scenarios 1 and 2 described in the foregoing embodiments, the solutions in which the secondary path is used to implement protection when the primary path is faulty are mainly described. However, during actual application, when the primary path is not faulty, the traffic packet still needs to be forwarded through the primary path. In this case, a node on the primary path needs to know that the secondary path information carried in the packet does not need to be used and performs corresponding processing such as removing or skipping, to avoid discarding of the packet because the secondary path information cannot be correctly parsed.

Still with reference to the scenario described in FIG. 1*a*, a manner of processing the SL label stack by the PE 24 when the egress node PE 24 is not faulty is described. In a scenario in which the egress node is not faulty, the PE 24 normally receives a service packet forwarded by the P 31. An SL label stack of the received service packet includes two layers of labels: B3::1 at the bottom of the stack and B2::1 at an upper layer of B3::1 in the label stack. After receiving the packet, the PE 24 can determine that a SID B2::1 carried in a DA field of a packet header matches a VPN SID locally allocated by the PE 24. In this case, the PE 24 further determines that a SID at a currently indicated location in the SRH is also B2::1. If no secondary SID is added, B2::1 is a stack bottom label of the SRH. In a conventional forwarding solution based on SRv6, because B2::1 is located at the bottom of the stack, the PE 24 may strip an outer packet header (namely, a packet header part including the IPv6 header and the SRH header that are shown in FIG. 1*a*), and forward the service packet to the user side based on a destination address 2.2.2.2 of the service packet included in inner payload information. However, in the implementation solution of egress protection in the scenario 1 provided in embodiments of the present disclosure, B2::1 is no longer a stack bottom label. If B3::1 cannot be correctly processed according to an existing forwarding rule of the SRv6 network, the PE 24 performs an operation of reporting an error or discarding the service packet. Therefore, to ensure normal forwarding of the service packet in the egress protection solution, the PE 24 needs to perform special processing on the label stack, that is, B3::1 at the bottom of the stack is allowed to be stripped together with B2::1 when B2::1 is matched with a local SID forwarding table.

To ensure normal forwarding of a service packet in a egress protection scenario, an embodiment of the present disclosure provides a method 400 for advertising, by a egress node (for example, the PE 24 shown in FIG. 1*a*) in an SRv6 network, a head node of whether the egress node has the foregoing special processing capability. If determining that a node that needs to be used as a primary egress node has the special processing capability, the head node may add, to the service packet, service labels allocated by the primary egress node and a secondary egress node, for example, a VPN SID used to identify a VPN service, to cooperate in executing a egress protection solution of a network system.

Figure 4:
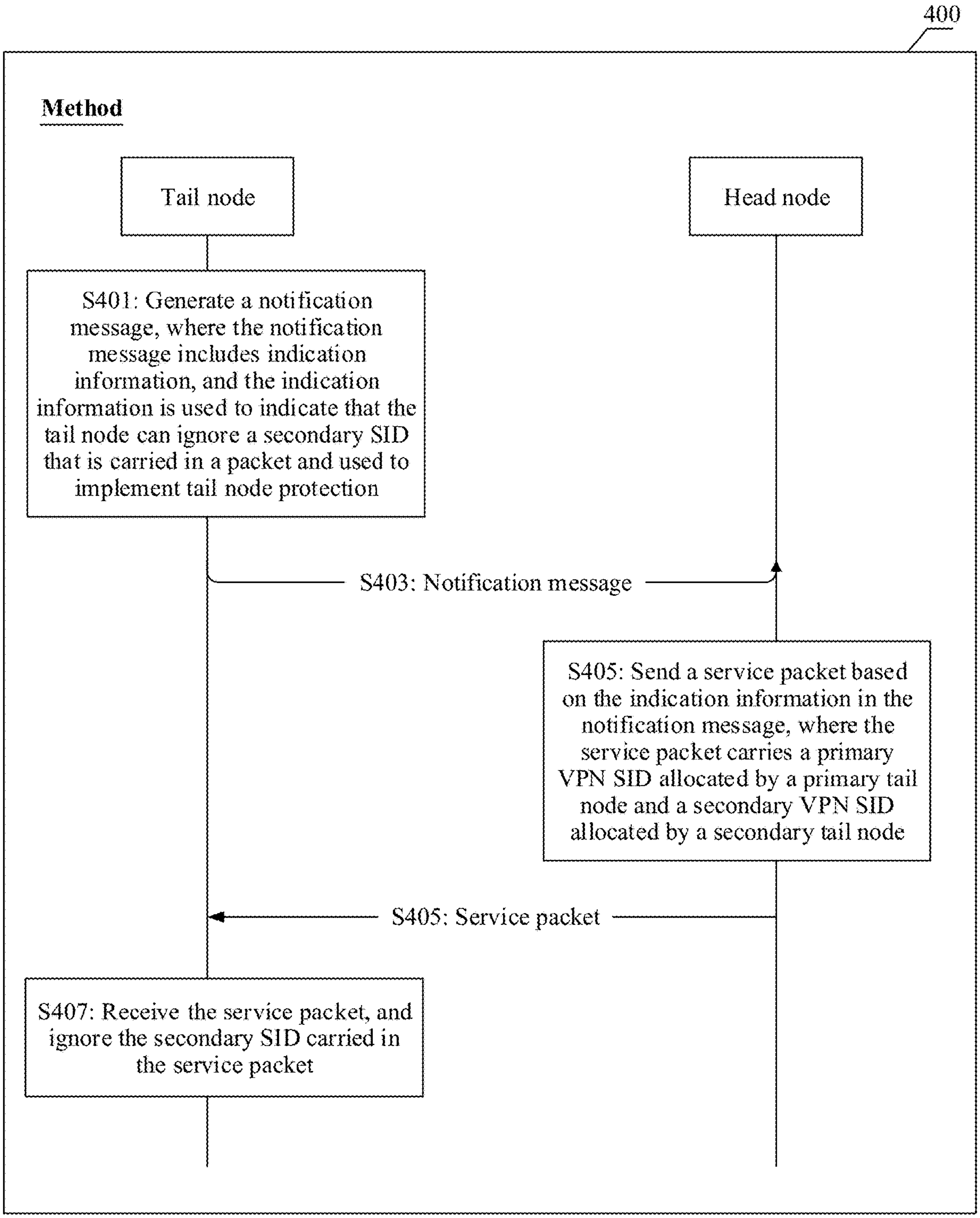
FIG. 4 is a flowchart of a method for advertising a processing capability of a network device according to an embodiment of this application.

FIG. 4 shows a method for advertising a processing capability of a egress node. The method may be implemented in the network system shown in FIG. 1*a* or FIG. 1*b*. The method may include the following operations.

S401: The egress node generates a advertisement message, where the advertisement message includes indication information, and the indication information is used to indicate that the egress node can ignore a secondary SID that is carried in a packet and used to implement egress protection.

The egress node PE 24 may generate indication information, where the indication information is used to advertise the head node PE 21 of whether the PE 24 serving as the egress node has the foregoing processing capability of ignoring the secondary SID in the service packet in the egress protection scenario. For ease of description, this capability is referred to as a processing capability for short below. The indication information may be carried in the advertisement message and sent to the head node PE 21. In some embodiments, the PE 24 determines, based on different content carried in the indication information, whether the PE 24 has the processing capability. In some embodiments, when the content included in the indication information is A, it indicates that the PE 24 has the processing capability; or when the content included in the indication information is B, it indicates that the PE 24 does not have the processing capability. In some embodiments, the PE 24 advertises the processing capability depending on whether the indication information is carried. In some embodiments, when the advertisement message includes the indication information, it indicates that the PE 24 has the processing capability; or when the advertisement message does not include the indication information, it indicates that the PE 24 does not have the processing capability. Regardless of an implementation, when the advertisement message sent by the PE 24 includes the indication information, the indication information may be independently used to indicate the processing capability of the PE 24, or may be used together with other information carried in the advertisement message to indicate the processing capability of the PE 24.

Figure 3A:
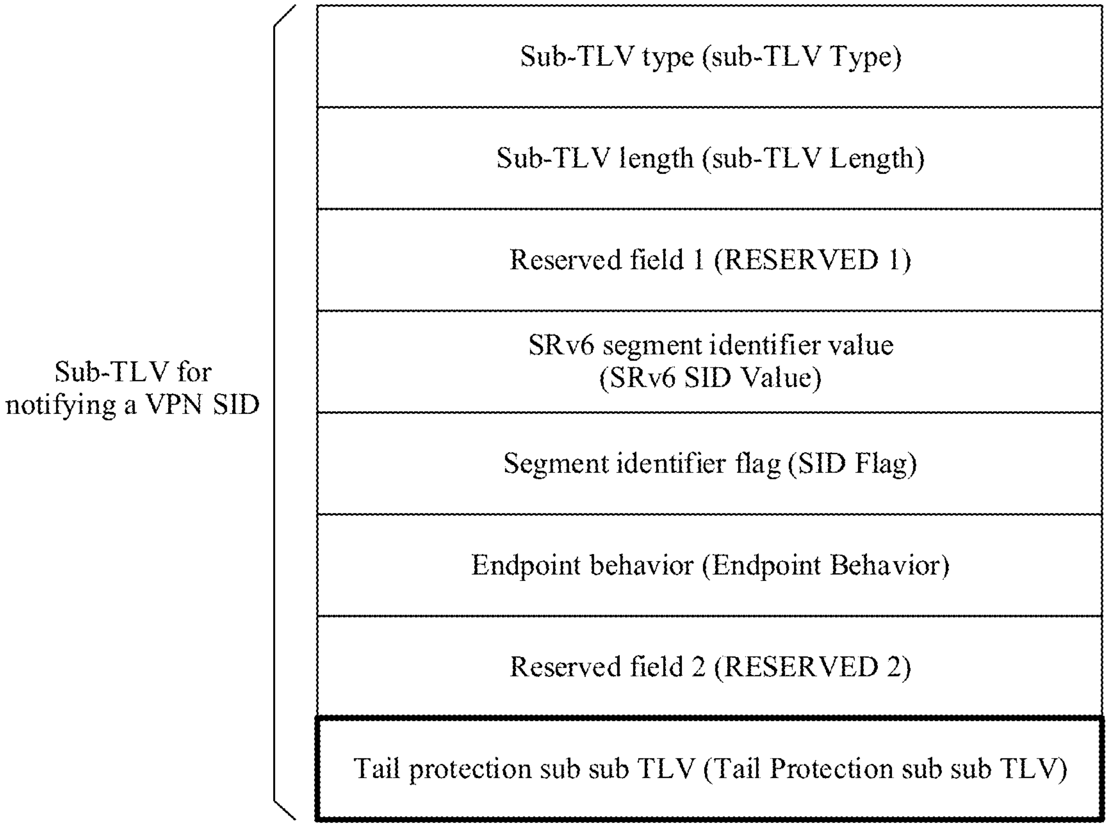
FIG. 3*a* is a schematic diagram of a message format according to an embodiment of this application.

The egress protection solution in the same AS domain described in FIG. 1*a* is used as an example. In a possible advertisement manner, the advertisement message may be a border gateway protocol (BGP) message. In the SRv6 network, the PE 24 may advertise a VPN SID label of a VPN route by using the BGP message. As shown in FIG. 3*a*, information related to the VPN SID may be carried in a segment identifier information type-length-value (SID information TLV) field in the BGP message. This field is a sub type-length-value (TLV) field in the BGP message. To advertise the processing capability of the PE 24, a subfield may be added to the SID information TLV field. The subfield may also be of a TLV type. Because this subfield belongs to a subfield in the SID information TLV field used as sub TLV, the subfield may be referred to as a sub sub TLV field. A type field of the sub sub TLV may be used to identify that a type of the sub sub TLV is a sub sub TLV for advertising a egress protection capability. A value field of the sub sub TLV includes the indication information used to indicate the processing capability of the PE 24, where a length of the value field is indicated by a length field of the sub sub TLV. In some embodiments, the length of the value field of the sub sub TLV may be 1 bit. In this case, it may be configured that when the value of the value field of the sub sub TLV is 1, it indicates that the PE 24 has the processing capability; or when the value of the value field of the sub TLV is 0, it indicates that the PE 24 does not have the processing capability. The implementation in which the length is 1 bit is only used as an example, and another length may alternatively be set based on a requirement, to meet a format requirement or advertise more subdivisions. In this implementation, regardless of whether the PE 24 has the processing capability, the PE 24 needs to know that a capability status of the PE 24 may be advertised by adding the sub sub TLV. However, in a possible case, because the PE 24 does not have the processing capability, the PE 24 does not know that the PE 24 needs to add the sub sub TLV to advertise that the PE 24 does not have the processing capability. Therefore, in some embodiments, the PE 24 may add the sub sub TLV when the PE 24 has the processing capability, and the PE 24 skips adding the sub sub TLV including the indication information without sense or with sense when the PE 24 does not have the processing capability. The skipping adding the sub sub LTV with sense means that the PE 24 knows that the PE 24 needs to add the sub sub TLV when the PE 24 has the processing capability, and knows that the PE 24 does not need to add the sub sub TLV when the PE 24 does not have the processing capability. After receiving the BGP message, the PE 21 may determine, depending on whether the BGP message carries the sub sub TLV or a value of the value field in the sub sub TLV carried in the BGP message, whether the PE 24 has the processing capability of supporting the path information in the egress protection scenario. In this scenario, the egress node PE 24 may also be referred to as an egress network device of a tunnel, and the head node PE 21 may be referred to as an ingress network device of the tunnel.

Figure 3B:
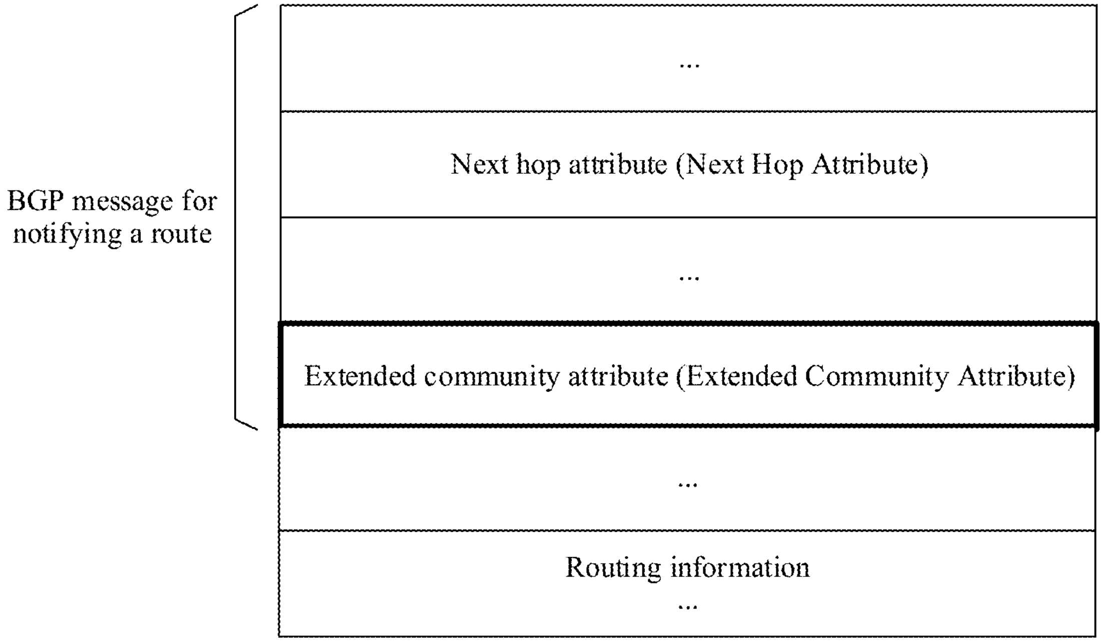
FIG. 3*b* is a schematic diagram of another message format according to an embodiment of this application.

The egress protection solution in the same AS domain described in FIG. 1*a* is still used as an example. In another possible advertisement manner, the advertisement message is still a BGP message, for example, may be a BGP message that is sent by the PE 24 and used to advertise a VPN route. The indication information may be carried in attribute information in the BGP message. For example, the attribute information is of an extended community attribute type. As shown in FIG. 3*b*, an extended community attribute used to advertise a egress protection capability is defined. The extended community attribute is used to carry the indication information, to indicate the processing capability of the PE 24.

In some embodiments, after receiving the advertisement message, the PE 21 may determine, based on the fact that the BGP message carries the extended community attribute, that the PE 24 has the processing capability, and when the extended community attribute is not carried, determine that the PE 24 does not have the processing capability. In this case, a form and content of the indication information carried in the extended community attribute may be appropriately designed as required.

In some embodiments, regardless of whether the PE 24 has the processing capability, the extended community attribute is added. After receiving the advertisement message, the PE 21 may determine, based on different content of the indication information carried in the extended community attribute, whether the PE 24 has the processing capability. For example, when the PE 24 has the processing capability, the indication information includes an indication field whose value is A, and when the PE 24 does not have the processing capability, the indication information includes the indication field whose value is B.

In some embodiments, the indication information carried in the extended community attribute and another attribute in the BGP message used as the advertisement message jointly indicate whether the PE 24 has the processing capability. In some embodiments, when the PE 24 has the processing capability, the PE 24 adds the extended community attribute to the BGP message, where the extended community attribute may include next hop information of the VPN route, and the next hop information is the indication information carried in the extended community attribute. The next hop information includes a device identifier of the PE 24, for example, a loopback address or an interface IP address of the PE 24. In a standard implementation of the BGP protocol, a next hop attribute carried in the BGP message also carries the next hop information. In this case, after receiving the advertisement message, the PE 21 may determine, based on the fact that the next hop information carried in the extended community attribute is consistent with the next hop information carried in the next hop attribute, that the PE 24 has the processing capability. An application scenario in which the PE 21 determines, based on the fact that the next hop information carried in the extended community attribute is inconsistent with the next hop information carried in the next hop attribute, that the PE 24 does not have the processing capability is further described below with reference to FIG. 1*b*.

The foregoing three cases are merely used as possible examples. In some embodiments, the indication information may alternatively be carried in another possible field in the BGP message, or may be carried in a advertisement message of another type for advertisement based on an application scenario requirement. In some embodiments, the indication information may be independently carried in the advertisement message, and is not advertised together with a service route, provided that the head node can establish, in an association manner, a relationship between the indication information and the service route for guiding service packet forwarding, and determine, based on the relationship, whether to include, in a sent service packet, path information on which the primary egress node needs to perform special processing.

Then, the inter-domain egress protection solution described in FIG. 1*b* is used as an example to describe another manner in which the egress node PE 24 generates the indication information and places the indication information in the advertisement message for advertisement. In this case, the PE 24 as the domain border node and the egress node of the multi-segmented tunnel A may receive a VPN route whose destination address is 2.2.2.2 and that is advertised by the PE 27 by using the BGP message. In this scenario, the egress node PE 24 may also be referred to as an egress network device of the multi-segmented tunnel A, and the head node PE 21 may be referred to as an ingress network device of the multi-segmented tunnel A.

If the foregoing manner in which the indication information is carried in the sub sub TLV of the VPN SID included in the VPN route is used, in a possible case, when the PE 24 receives the BGP message advertised by the PE 27, a first sub sub TLV used by the PE 27 to advertise a processing capability of the PE 27 serving as a egress node of the tunnel B for the secondary SID is included, and the first sub sub TLV is carried in a first VPN SID allocated by the PE 27. When receiving the BGP message, the PE 24 needs to modify a next hop, reallocate a second VPN SID for the VPN route whose destination address is 2.2.2.2, and replace the received first VPN SID including the first sub sub TLV. In this case, the PE 24 may add a newly generated second sub sub TLV to the reallocated second VPN SID, to indicate whether the PE 24 serving as the egress node of the tunnel A has the processing capability for the secondary SID. It may be understood that, if the PE 27 does not have the processing capability, the first sub sub TLV may not be carried in the first VPN SID.

If the foregoing manner in which the indication information is carried in the extended community attribute in the BGP message is used, in a possible case, if the PE 27 has the processing capability, the PE 27 may add same next hop information, for example, a loopback address of the PE 27, to the next hop attribute and the extended community attribute in the BGP message sent to the PE 24. When receiving the BGP message, the PE 24 as the egress node of the tunnel A needs to modify the next hop attribute in the BGP message to the loopback address of the PE 24. In this case, if the PE 24 has the processing capability, the PE 24 may also modify the next hop information in the extended community attribute to the loopback address of the PE 24. However, if the PE 24 knows that the processing capability can be advertised by using the extended community attribute, but does not have the processing capability, or even does not know that the processing capability can be advertised by using the extended community attribute, the PE 24 does not modify the next hop information in the extended community attribute. That is, in this case, the next hop information in the extended community attribute still indicates the PE 27. Therefore, when receiving an updated BGP message from the PE 24, the PE 21 may determine, depending on whether the next hop attribute carried in the BGP message is consistent with the next hop information included in the extended community attribute, whether the PE 24 has the processing capability. If the next hop attribute carried in the BGP message is consistent with the next hop information included in the extended community attribute, it indicates that the PE 24 has the processing capability; or if the next hop attribute carried in the BGP message is inconsistent with the next hop information included in the extended community attribute, it indicates that the PE 24 does not have the processing capability.

S403: The egress node forwards the advertisement message to the head node.

The egress node advertises the generated advertisement message, where the advertisement message may be first received by one or more intermediate nodes and scattered until being received by the head node PE 21. FIG. 1*a* is still used as an example. The advertisement message sent by the PE 24 is first received by the P 31, and the P 31 serving as a backbone node does not perform any processing on the advertisement message, but directly forwards the advertisement message to a next node. For brief description, for example, in the figure, a next hop of the P 31 is the head node PE 21. In an actual application scenario, one or more intermediate nodes may be further included between the P 31 and the PE 21. In an example, for the intra-domain scenario described in FIG. 1*a*, the egress node PE 24 as a PE device connected to a user-side device may generate the advertisement message for the first time. For the inter-domain scenario described in FIG. 1*b*, the egress node PE 24 may serve as an egress node of a multi-segmented tunnel, or may be understood as an intermediate node of an end-to-end tunnel including a plurality of multi-segmented tunnels, and modify the advertisement message to update the advertisement message after receiving the advertisement message generated and advertised by the PE 27. In this case, that the egress node PE 24 generates a advertisement message in S401 may be understood as that the PE 24 updates the received advertisement message, which is considered as re-generation.

S405: The head node sends a service packet based on the indication information in the advertisement message, where the service packet carries a primary VPN SID allocated by a primary egress node and a secondary VPN SID allocated by a secondary egress node.

After receiving the advertisement message advertised by the PE 24, the head node PE 21 may determine, based on different embodiments, whether the PE 24 has the processing capability, whether the advertisement message carries the indication information, or\content of the carried indication information.

In some embodiments, before receiving the advertisement message advertised by the PE 24, the head node PE 21 may not know or determine in advance that the PE 24 is the primary egress node. In this case, the head node PE 21 may further receive, from another device PE 25 that can serve as a egress node, a advertisement message advertised by the PE 25, to determine, based on indication information carried in the advertisement message advertised by the PE 25, whether the PE 25 has a processing capability. For a manner of advertising the processing capability of the PE 25 by using the indication information included in the advertisement message, refer to the related descriptions of advertising the processing capability of the PE 24 in S201 and S203. Details are not described herein again. After receiving the advertisement messages separately advertised by the PE 24 and the PE 25, the PE 21 may determine a primary egress node and a secondary egress node depending on whether the PE 24 and the PE 25 have the processing capabilities or further with reference to a local policy, and separately use, based on role settings, a VPN SID advertised by the primary egress node as a primary SID and a VPN SID advertised by the secondary egress node as a secondary SID.

In some embodiments, the head node PE 21 may know a primary role and a secondary role of the PE 24 and the PE 25 in advance. In this case, the head node PE 21 may alternatively receive only the advertisement message advertised by the PE 24. In addition, before sending a service packet of a VPN, the head node PE 21 further separately obtains a VPN route advertised by the primary egress node PE 24 and a route advertised by the secondary egress node PE 25. The VPN route advertised by the primary egress node PE 24 may be carried in the advertisement message, for example, a BGP message, sent by the PE 24. The VPN route advertised by the PE 24 includes the VPN SID B2::1 allocated by the PE 24 to the VPN, and the VPN route advertised by the PE 25 includes the VPN SID B3::1 allocated by the PE 25 to the VPN.

Regardless of a used determining manner, when determining that the PE 24 does not have the processing capability, the PE 21 may select a conventional manner, that is, encapsulate the VPN SID B2::1 as a stack bottom label into an SRH header of the packet of the VPN service and send the packet. When determining that the PE 24 has the processing capability, the PE 21 may use B3::1 as a stack bottom label, place B2::1 at a stack label location adjacent to B3::1, encapsulate B2::1 into the SRH header of the packet of the VPN service, and send the packet.

S407: The egress node receives the service packet, and ignores the secondary SID carried in the service packet.

In some embodiments, when receiving the service packet that carries the primary SID and the secondary SID, the egress node serving as the primary egress node may decapsulate a packet header of the service packet based on a matching result of the primary SID, even if the packet header further includes the secondary SID at the bottom of the stack, to complete subsequent forwarding based on user-side routing information carried in a payload part of the service packet. The SRv6 network shown in FIG. 1*a* is still used as an example. When the primary egress node PE 24 is not faulty, the PE 24 can receive the packet of the VPN service sent by the head node PE 21, and find that SID information carried in a DA field of a current IPv6 header matches the VPN SID B2::1 allocated by the PE 24. In this case, the packet header of the service packet may be decapsulated. Because the SRH of the packet header includes the primary SID B2::1 and the secondary SID B3::1, through the decapsulation operation, B2::1 and B3::1 are removed together. That is, in this case, that the PE 24 performs ignoring processing on the secondary SID carried in the service packet is implementing ignoring without processing through removal. After the packet header is decapsulated, a virtual routing and forwarding (VRF) table may be searched based on the destination address 2.2.2.2 included in the payload part of the packet, to complete forwarding of the packet to a user side.

In some embodiments, when receiving the service packet that carries the primary SID and the secondary SID, the egress node serving as the primary egress node may search for a SID list corresponding to the primary SID based on the matching result of the primary SID, and add the SID list to the service packet, to guide subsequent forwarding. The SRv6 network shown in FIG. 1*b* is still used as an example. When the primary egress node PE 24 of the tunnel A is not faulty, the PE 24 can receive the packet of the VPN service sent by the head node PE 21. In addition, because the PE 24 modifies the next hop and reallocates the VPN SID B2::1 that identifies the VPN service during advertisement of the VPN route, when receiving the packet of the VPN service, the PE 24 finds that SID information carried in a DA field of a current IPv6 header matches the VPN SID B2::1 allocated by the PE 24. In this case, the PE 24 may locally search for a SID list corresponding to B2::1, where the SID list is used to indicate forwarding of the service packet from the PE 24 to the PE 27. In this case, based on different implementations, in a possible case, the PE 24 may first remove a packet header associated with the tunnel A, and add, to the packet, a packet header that includes the SID list and that is associated with the tunnel B. In this case, it is equivalent that the PE 24 ignores B3::1 through removal. In another possible case, the PE 24 may alternatively add the SID list to the packet, skip B3::1, and read a SID in the SID list to guide packet forwarding.

Figure 5:
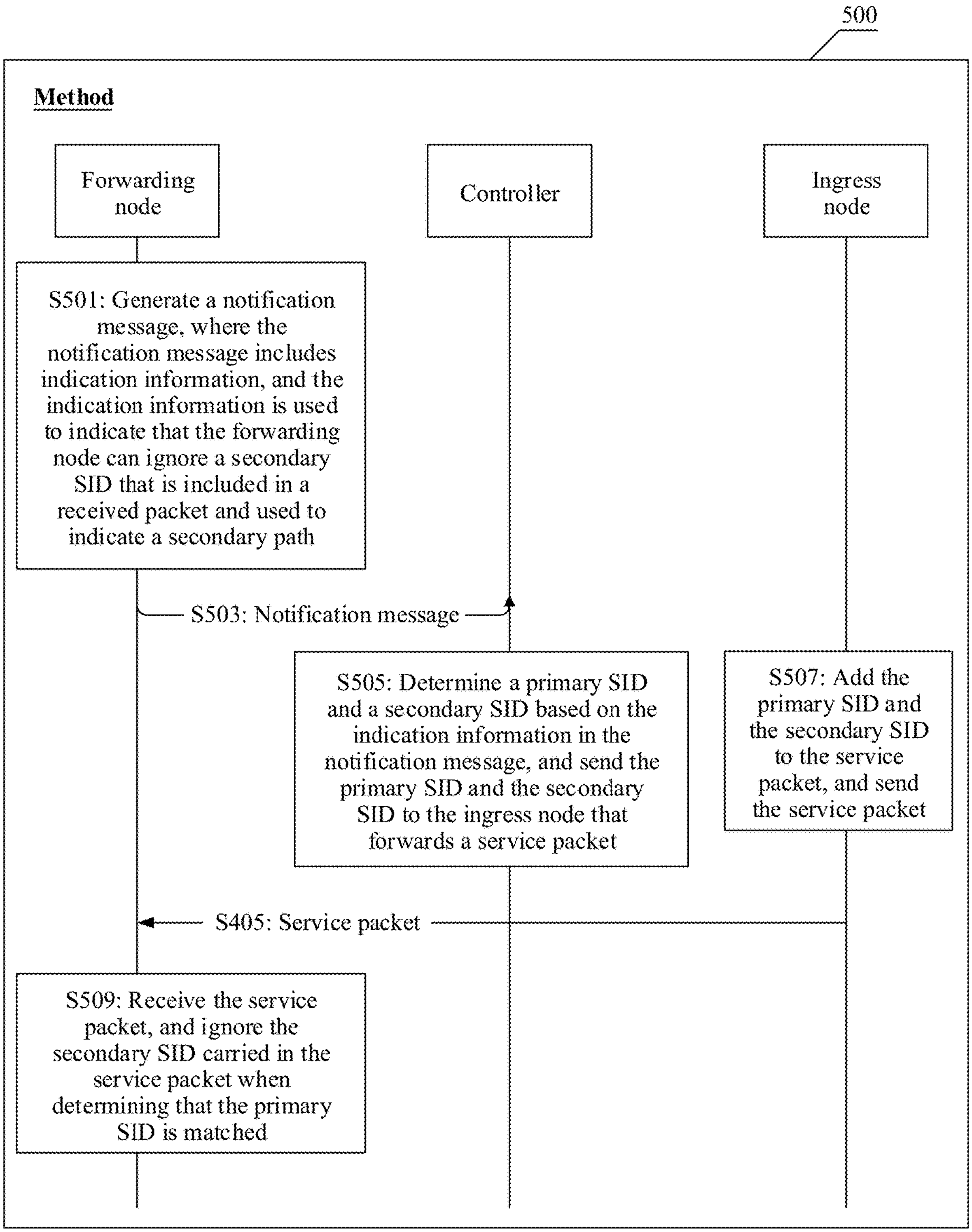
FIG. 5 is a flowchart of another method for advertising a processing capability of a network device according to an embodiment of this application.

In the method 400, the head node may play a role of path orchestration. The head node determines, based on advertisement information advertised by the egress node to the head node, whether the egress node has the special processing capability for the secondary path information in the packet, to ensure that the egress node is set as the primary egress node when the egress node has the processing capability, so as to ensure that an operation such as removing or skipping can be performed to ignore the secondary path information when the primary egress node is not faulty. This ensures normal packet forwarding when the primary egress node is not faulty. The method 400 may be applied to the egress protection solution described in the scenario 1 in this application, or may be applied to another possible scenario in which the head node needs to determine, based on a processing capability status advertised by another node on a packet transmission path, whether a packet carries secondary path information. In another possible application scenario, for example, the scenario 2 described in this application, a controller may also play the role of path orchestration. Therefore, an embodiment of this application further provides a method 500. According to the method, the controller may determine a processing capability of a forwarding node based on a advertisement message received from the forwarding node, to determine, based on the advertisement message, whether a path orchestrated for packet forwarding may include secondary path information, to ensure normal forwarding of a packet when a primary path is not faulty. FIG. 5 shows a method for advertising a processing capability of a egress node. The method may be implemented in the network system shown in FIG. 2. The method may include the following operations.

S501: A forwarding node generates a advertisement message, where the advertisement message includes indication information, and the indication information is used to indicate that the forwarding node can ignore a secondary SID that is included in a received packet and used to indicate a secondary path.

A role of the forwarding node on a forwarding path may be an intermediate node or an egress node of a tunnel. Different from a manner in which the indication information and a route (for example, a VPN route) for service forwarding are carried in a message for advertisement, in a scenario in which a controller exists, the forwarding node may generate a control-type advertisement message, for example, a BGP link state protocol (BGP-LS) message, to advertise a processing capability of the forwarding node. The indication information may be carried in a specified field in the BGP-LS message, and whether the forwarding node has the processing capability may be determined based on different content included in the indication information. In a possible case, the forwarding node may further advertise the controller of a SID allocated by the forwarding node, for example, the SID of the service type in the scenario 2, or a node SID indicating the forwarding node. In another possible case, a SID that needs to be matched or used by the forwarding node may alternatively be configured and delivered by the controller.

S503: The forwarding node forwards the advertisement message to the controller.

Each forwarding node that belongs to a management domain range of the controller and that includes the forwarding node may send a advertisement message to the controller. The advertisement message may be actively sent by each forwarding node to the controller, or may be sent as a response after a control instruction sent by the controller is received.

S505: The controller determines a primary SID and a secondary SID based on the indication information in the advertisement message, and sends the primary SID and the secondary SID to an ingress node that forwards a service packet.

After receiving the advertisement message sent by the forwarding node, the controller determines, based on the indication information carried in the advertisement message, whether the forwarding node has the processing capability. The controller may further determine, based on indication information carried in advertisement message sent by another forwarding node, whether the another forwarding node has a processing capability. The controller may orchestrate a service forwarding path depending on whether each forwarding node has a processing capability and with reference to a service requirement and a capability status of each node, to determine the primary SID associated with a primary forwarding node and the secondary SID associated with a secondary forwarding node. The primary SID and the secondary SID may be SIDs of a node type or SIDs of a service type, or may be SIDs of another defined type. SIDs of different types may be used to indicate nodes on the forwarding path to perform corresponding operations when the SIDs are matched.

In S505, that the controller receives the advertisement message and completes path orchestration based on the advertisement message is used as an example. In another possible embodiment, a path orchestrator independent of the controller may complete a function that is performed by the controller and that is of orchestrating the path based on the advertisement message and sending an orchestrated path to the ingress node. In some embodiments, the path orchestrator may alternatively be integrated into the controller as a component of the controller.

S507: The ingress node adds the primary SID and the secondary SID to the service packet, and sends the service packet.

A manner of receiving the primary SID and the secondary SID by the ingress node from the controller may be receiving, from the controller, end-to-end path orchestration information for guiding forwarding from the ingress node to the egress node, where the end-to-end path orchestration information includes the primary SID and the secondary SID, or may be receiving, from the controller, local path orchestration information for guiding forwarding on some key path segments. The local path orchestration information includes the primary SID and the secondary SID. After receiving the local path orchestration information, the ingress node continues to obtain other SID information for guiding service packet forwarding, and generates, by using the local path orchestration information and the other SID information that continues to be obtained, complete path information to guide forwarding. For example, in the scenario 2, the controller may orchestrate only a local path related to a cleaning service of a firewall, that is, send at least the primary SID and the secondary SID that are used to implement service protection to the forwarding node. Then, the forwarding node combines obtained path information for guiding forwarding of the service packet to the egress node and orchestration information of the local path, to determine complete path information that can support service protection.

The path information that is sent by the ingress node and that includes the primary SID and the secondary SID may be carried in a packet header of the service packet. For example, in an SRv6 network, the primary SID and the secondary SID may be encapsulated into an SRH of an IPv6 extension header. In an SR-MPLS network, the primary SID and the secondary SID may be encapsulated into an MPLS packet header.

S509: The forwarding node receives the service packet, and ignores the secondary SID carried in the service packet when determining that the primary SID is matched.

In a scenario in which a primary path on which the forwarding node is located is not faulty, after receiving the service packet, the forwarding node may find that the primary SID carried in the service packet may match a locally stored SID, and may perform a corresponding operation based on the matching result. That the primary path on which the forwarding node is located is not faulty may be, for example, that the forwarding node serving as a primary node is not faulty, or that a primary service node that is connected to the forwarding node and that provides a service is not faulty. For example, if a type of the primary SID is a VPN SID and the primary SID is applied to the scenario described in FIG. 1*b*, the forwarding node may obtain a SID list corresponding to the primary SID, and add the SID list to a packet header to guide forwarding of the packet in a next domain. For another example, if the type of the primary SID is a SID of a service type in the scenario described in FIG. 2, the forwarding node may determine, based on the SID of the service type, a firewall that can provide a service, and send the service packet to the firewall to complete cleaning.

In the foregoing scenario in which the primary path is not faulty, the secondary SID associated with the secondary node does not need to be used. To ensure subsequent normal forwarding of the service packet, the forwarding node serving as the primary node needs to ignore the secondary SID carried in the service packet. A processing manner of ignoring the secondary SID may vary with a scenario. For example, in the scenario shown in FIG. 2, if finding that the firewall 51 on the primary path is not faulty, the PE 22 may determine, based on the SID S2::1 that is of the service type and associated with the firewall 51, the primary path for forwarding the service packet to the firewall 51, to clean the service packet by using the firewall 51. In this case, to avoid a packet forwarding error, the PE 22 needs to ignore the secondary SID. In this scenario, the PE 22 may not be an egress network device forwarding the service packet, but the PE 22 as an intermediate network device on the packet forwarding path needs to continue to perform forwarding by using another SID located after the secondary SID. Therefore, the secondary SID cannot be ignored by removing the packet header, and only the secondary SID in the label stack can be skipped to read another SID required by subsequent forwarding. That is, in the scenario shown in FIG. 2, the PE 22 needs to ignore the secondary SID in a skipping manner. Based on different SID carrying manners and application scenarios, the skipping herein may include: directly skipping the secondary SID without reading the secondary SID, or reading the secondary SID but skipping performing any operation by using the secondary SID.

For example, in FIG. 2, the secondary path information includes one secondary SID. In another possible scenario, the secondary path information may alternatively include a plurality of secondary SIDs. The plurality of secondary SIDs may be used to indicate a plurality of secondary paths, or the plurality of secondary SIDs may be used to indicate one secondary path. The forwarding node needs to know when one or more secondary SIDs need to be skipped. In addition, in some cases, for example, when a quantity of secondary SIDs is not a fixed value, the forwarding node needs to know a quantity of secondary SIDs that need to be skipped. In some embodiments, when a primary SID of a type is matched, the forwarding node skips a predetermined quantity of secondary SIDs. For example, when finding that the SID S2::1 of the service type is matched, the PE 22 in FIG. 2 may skip a next SID, namely, the secondary SID S1::1, in a current SID list carried in the service packet. In some embodiments, the forwarding node may determine, based on indication information associated with the primary SID, one or more secondary SIDs that needs to be skipped and that are located after the primary SID when the primary SID is matched. The indication information may include, for example, a value of a quantity of SIDs that need to be skipped. Similarly, the indication information may alternatively be associated with the secondary SID, for example, associated with a first secondary SID, to indicate a quantity of SIDs that need to be skipped and that include the secondary SID. The foregoing is merely a possible example, and another indication manner may be designed, so that the forwarding node can determine one or more secondary SIDs that need to be ignored. For ease of description, the SID that needs to be ignored by the forwarding node is referred to as a secondary SID. However, during actual application, the forwarding node may not really know that a SID that needs to be ignored by the forwarding node is a SID indicating a secondary path, but only determines, according to a locally defined rule or based on the indication information, that the forwarding node needs to ignore one or more subsequent SIDs.

In addition, although the implementation in which the controller sends the primary SID and the secondary SID to the ingress node is described in S505, in some embodiments solution, the controller may alternatively be allowed to determine the primary node and the secondary node among the forwarding nodes based on only the advertisement messages received from the forwarding nodes, and send, to the ingress node, a message that is used to indicate the primary node and the secondary node on the packet forwarding path. Then, the ingress node locally obtains, based on the message, the primary SID associated with the primary node, and obtains the secondary SID associated with the secondary node.

With reference to the scenarios 1 and 2, the foregoing describes a solution in which the ingress network device or the controller can determine, based on the indication information carried in the advertisement message received from the forwarding node, whether the forwarding node has the capability of ignoring the secondary path information, and when determining that the forwarding node has the capability, add the secondary path information to the packet sent to the forwarding node. According to the corresponding solution, when determining that the forwarding node configured on the primary path has a corresponding capability, the ingress network device or the controller for orchestrating the path can add the secondary path information to the packet that needs to be forwarded, to ensure that when the primary path is not faulty, the forwarding node can ignore the secondary path information in the packet and does not use the secondary path information to determine the secondary path. This ensures normal forwarding of the packet in a scenario in which the primary path is not faulty.

The method 400 and the method 500 may be respectively applied to the scenario 1 and the scenario 2 described above. However, the solution that is similar to the method 400 and the method 500 and used to determine, based on a capability status advertised by a forwarding node, whether secondary path information is carried in a packet may be applied to more application scenarios. The following describes a method 600 for advertising a processing capability of a network device according to an embodiment of the present disclosure. The method 600 may be applied to different application scenarios including the scenario 1 and the scenario 2.

S601: A first network device generates a advertisement message, where the advertisement message includes indication information, the indication information is used to indicate a processing capability of the first network device, the processing capability of the first network device includes a processing capability of ignoring secondary path information when the first network device serves as a network device on a primary path for forwarding a packet and receives the packet including primary path information and the secondary path information, and the secondary path information is used to indicate one or more secondary paths for forwarding the packet when the primary path is unavailable.

The first network device may be, for example, an egress network device or an intermediate network device of a tunnel on a forwarding path. The advertisement message carrying the indication information may be of any possible message type determined with reference to a network architecture and an application scenario, for example, an IGP message, a BGP-LS message, or a BGP message used to advertise a route. If a device receiving the advertisement is an ingress network device of the tunnel, the BGP message for advertising a VPN route may be used to carry the indication information, for example, refer to S401 in the method 400. If the ingress network device receiving the advertisement and the first network device serving as the egress network device or the intermediate network device are devices belonging to a same network domain, the IGP message may alternatively be used to carry the indication information. If the device receiving the advertisement is a controller or a path orchestrator, the BGP-LS message may be used to carry the indication information, for example, refer to S501 in the method 500. The BGP message may be further used to advertise a public route. When the device receiving the advertisement is a network device on a public network forwarding path, public network routing information in the BGP message may further be used to carry the indication information. For example, the indication information is carried in a public segment identifier (public SID) field of the public route.

In some embodiments, it may be determined, based on the fact that the indication information is carried, that the first network device has the processing capability, or it is determined, based on that the fact that the indication information is not carried, that the first network device does not have the processing capability, for example, the implementation of the sub sub TLV described in S401 in the method 400. In some embodiments, it may be determined, based on the fact that the carried indication information is a first value, that the first network device has the processing capability, or it is determined, based on the fact that the carried indication information is a second value different from the indication information, that the first network device does not have the processing capability. In some possible cases, both the indication information having the first value or the second value and other information carried in the advertisement message may be used as information for determining whether the first network device has the processing capability, for example, the implementation that is described in S401 in the method 400 and in which whether information carried in an extended community attribute in the BGP message is consistent with information carried in a next hop attribute is determined through comparison.

The processing capability advertised by the first network device by using the advertisement message includes the processing capability of ignoring, by the first network device, the secondary indication information carried in the received service packet. For example, when the primary path is not faulty, when receiving the service packet, the first network device can perform matching on the primary path information carried in the service packet, and ignore the secondary path information included in the service packet after the matching succeeds. The primary path information may be understood as one or more fields that can be used to indicate the primary path and that are included in the packet. The scenario shown in FIG. 1*a* is used as an example. In an SRv6 network, a packet of a VPN service sent by the PE 21 may carry a packet header including an IPv6 header and an SRH header. In this case, primary path information may include all SIDs in the SRH header except the secondary SID B3::1, and may further include a SID included in a DA field in the IPv6 header. The SID included in the DA field may dynamically change in a forwarding process. In some possible application scenarios, the primary path information may also be considered as a corresponding primary SID (for example, B2::1) that forms primary/secondary protection with the secondary SID (for example, B3::1), provided that the primary SID is used as the primary path information and can fully perform various possible functions that need to be completed based on the primary path information and that are described in embodiments of the present disclosure.

It may be understood that the secondary path information is used to indicate one or more secondary paths for forwarding the packet when the primary path is unavailable. When the first network device serving as a primary node is faulty, for example, refer to the descriptions in the foregoing scenario 1, or when a device that is connected to the first network device and that can provide a service is faulty, for example, refer to the descriptions in the foregoing scenario 2, the primary path is unavailable. However, if the foregoing two possible fault types or another fault scenario that may cause unavailability of the primary path, for example, a link used to connect to the primary node is faulty, does not occur, when receiving the service packet, the first network device located on the primary path needs to perform special processing on the secondary path information included in the service packet, to avoid that the secondary path information affects normal packet forwarding. In some embodiments, a manner in which the first network device ignores the secondary path information may be removal. The removal may be removal implemented by removing an entire packet header in the SRv6 network scenario shown in FIG. 1*a*. In this scenario, the first network device serving as a egress node connected to a user-side device may remove the entire packet header of the packet of the VPN service after the VPN SID B2::1 is matched, and complete subsequent forwarding from the first network device to the user-side device by using VPN information carried in a payload part of the packet. In this stripping manner, the primary path information and the secondary path information included in the packet header are removed together. However, in an SR-MPLS network, because a SID that has been used (for example, matching has been completed) in a packet header is popped out from a SID list, in the SR-MPLS network, regardless of whether a role of the first network device is an intermediate node or a egress node, after primary path information, for example, a primary SID associated with the first network device, is matched, the first network device determines, according to a local preset rule or based on indication information carried in the packet, that a pop operation needs to be performed on one or more secondary SIDs located after the primary SID, where the pop operation causes removal of the one or more secondary SIDs. In some embodiments, a manner in which the first network device ignores the secondary path information may be skipping, where the skipping may be skipping the second path information directly without reading the secondary path information, or skipping the second path information in an ignorable manner without using the secondary path information to guide forwarding although the secondary path information is read. For example, in the SRv6 network scenario shown in FIG. 2, after the primary SID S2::1 used as primary path information is matched, the intermediate node PE 22 needs to skip the secondary SID S3::1 next to S2::1 in a label stack, that is, does not use S3::1 to guide packet forwarding to the secondary firewall 52, to avoid a packet forwarding error. The manner of ignoring the secondary path information may alternatively be designed in another manner based on a requirement. For example, it is allowed to mark the secondary path information, to identify, by using the mark, that the secondary path information is not used.

It can be learned that, a case of ignoring processing may be that the first network device ignores the secondary path information, and does not use the secondary path information to guide packet forwarding, or may be that the first network device ignores the secondary path information and can normally process the packet, for example, allowed to strip a packet header off the packet when the secondary path information is included. There may be a plurality of operation manners for implementing ignoring, and an operation manner may be determined with reference to an application scenario. In addition, performing ignoring does not mean that the first network device definitely does not perform any operation on the secondary path information. For example, in some embodiments, the first network device may first read the secondary path information, and ignore the secondary path information in a skipping manner.

In each of the schematic diagrams of FIG. 1*a*, FIG. 1*b*, and FIG. 2, one secondary SID is used as the secondary path information. However, in another possible application scenario, the secondary path information may alternatively include a plurality of secondary SIDs, and the plurality of secondary SIDs may be used to respectively indicate a plurality of secondary paths that can be used when the primary path is faulty, or some or all of the plurality of secondary SIDs may be used to jointly indicate a secondary path. When the plurality of secondary SIDs respectively indicate the plurality of secondary paths, a sequence of using the plurality of secondary paths may be determined based on an arrangement sequence of the plurality of secondary SIDs in the SID list.

S603: The first network device sends the advertisement message to a second network device.

In a possible case, the first network device may directly send the advertisement message to the second network device. For example, the first network device that plays a role of a forwarding node sends the advertisement message to the second network device that plays a role of a controller or a path orchestrator by using the BGP-LS message. For example, refer to the descriptions in S503 in the method 500. In another possible case, the first network device indirectly sends the advertisement message to the second network device. For example, the first network device that plays a role of the egress node scatters and advertises the BGP message hop by hop to the second network device that plays a role of a head node by using the BGP message for advertising the VPN route. For example, refer to the descriptions in S403 in the method 400. In this case, the second network device that plays the role of the head node may be, for example, the PE 21 shown in FIG. 1*a* or 1*b*, or the PE 24 that is shown in FIG. 1*b* and that serves as both the domain border node and the head node of tunnel B. In some embodiments, the PE 24 may serve as the egress node of the tunnel A to advertise the processing capability to the head node PE 21 of the tunnel A in a manner such as modifying a next hop of the VPN route, or may serve as the head node of the tunnel B to receive a processing capability advertised by the egress node PE 27 of the tunnel B (where a secondary node of the PE 27 is not shown in FIG. 1*b*). The second network device that plays the role of the head node may alternatively be the PE 25 shown in FIG. 1*b*. For example, the egress node PE 27 and another PE node that forms dual-homing nodes with the PE 27 may also send an advertisement message to the PE 25. In this way, in a scenario in which the PE 24 is faulty, the packet is forwarded to the secondary node PE 25, and the PE 25 may implement packet forwarding in an egress protection mode based on the advertisement message that is received first.

S605: The second network device receives the advertisement message, and determines, based on the indication information in the advertisement message, that the first network device has the processing capability.

After receiving the advertisement message, the second network device may determine, based on the indication information in the advertisement message, whether the first network device has the processing capability of ignoring the secondary path information included in the packet when the primary path information included in the packet is matched. Based on different implementation forms of the advertisement message or different implementations of the indication information in the advertisement message, the second network device may determine the processing capability of the first network device in different manners. For example, when the advertisement message is the BGP message for advertising a route, refer to the descriptions in S405 in the method 400. For another example, when the advertisement message is the BGP-LS message, refer to the descriptions in S505 in the method 500.

When determining that the first network device has the processing capability, the second network device may perform different subsequent operations with reference to different roles played by the second network device. In a possible case, when the second network device is the head node PE 21 shown in FIG. 1*a* or FIG. 1*b*, the second network device may add first primary path information and first secondary path information to a first packet of the service that needs to be sent. Alternatively, when the second network device is the domain border node PE 24 shown in FIG. 1*b*, after ignoring the secondary path information associated with the tunnel A in the received first packet, the second network device may add first primary path information and first secondary path information that are associated with the tunnel B before continuing to forward the first packet, to guide forwarding of the first packet on the tunnel B in the egress protection mode. For example, refer to the descriptions in S405 in the method 400. In another possible case, when the second network device is the service orchestrator 41 shown in FIG. 2, the second network device may determine, based on the fact that the PE 22 has the processing capability, the primary SID S2::1 and the secondary SID S3::1 that are associated with the PE 22. Then, the second network device delivers S2::1 and S3::1 to the head node PE 21 that forwards the first packet. The PE 21 orchestrates S2::1 and S3::1 into a SID list used to guide forwarding of the first packet, to generate the first primary path information and the first secondary path information that are included in the first packet, to guide the first packet to be forwarded in a manner that can implement service protection. In this case, the service orchestrator 41 may alternatively directly determine complete primary/secondary path information including S2::1 and S3::1, and send the complete primary/secondary path information to the head node. For example, refer to the descriptions in S505 and S507 in the method 500.

The foregoing two cases may also be used together in some scenarios. For example, the head node adds both primary and secondary SIDs of a service type for implementing service protection and primary and secondary VPN SIDs for implementing egress protection to the first packet.

S607: The first network device receives the first packet, where the first packet includes the first primary path information and the first secondary path information.

Based on the descriptions in S606, the first primary path information and the first secondary path information in the first packet received by the first network device may be generated by the second network device to which the first network device advertises the processing capability, may be generated by another network device, for example, the head node, by combining local primary and secondary path information sent by the second network device to which the first network device advertises the processing capability, or may be added to the first packet based on complete primary and secondary path information sent by the second network device to which the first network device advertises the processing capability.

The implementation in the SRv6 network is used as an example. A previous-hop node of the first network device may add the SID associated with the first network device to the DA field of the IPv6 header of the first packet, and forward the first packet to the first network device.

S609: The first network device ignores the first secondary path information, and forwards the first packet based on the first primary path information.

The SRv6 network is still used as an example. When the primary path is not faulty, the first network device can perform matching on the SID that is associated with the first network device and that is included in the primary path information. In this case, the first secondary path information included in the first packet may be ignored. The ignoring may be removing or skipping. For example, refer to the descriptions in S407 in the method 400, or refer to the descriptions in S509 in the method 500.

In addition to ignoring the first secondary path information, the first network device may further forward the first packet based on the first primary path information. For example, in the SRv6 network, the first network device guides subsequent forwarding of the first packet based on a SID that is located after one or more secondary SIDs and that belongs to the first primary path information, where the one or more secondary SIDs form the secondary path information.

In this method, the first network device can send the advertisement message carrying the indication information, where the indication information can indicate whether the first network device has the processing capability of ignoring the secondary path information included in the packet when the first network device serves as the network device on the primary path for forwarding the packet and receives the packet including the primary path information and the secondary path information, so that when determining that the first network device has the processing capability, the second network device receiving the advertisement message can send or indicate another network device to send a service packet including the primary path information and the secondary path information to the first network device. Therefore, when the primary path can be used normally, the first network device can ignore the secondary path information that does not need to be used in the service packet, to ensure network running robustness and avoid a problem of a packet loss or incorrect forwarding caused by inappropriate processing on the secondary path information.

The methods for advertising a processing capability of a network device provided in embodiments of this application is described in detail above with reference to the accompanying drawings. It may be understood that, to implement the functions described in the foregoing methods, network devices configured to perform the methods need to include corresponding hardware and/or software modules for performing the functions. This application can be implemented in a form of hardware or a combination of hardware and computer software with reference to the execution processes of the methods described in the embodiments disclosed in this specification. Whether a function is performed by hardware or hardware driven by computer software depends on particular applications and design constraints of the technical solutions. A person skilled in the art may use different manners to implement the described functions for each particular application with reference to embodiments, but it should not be considered that the implementation goes beyond the scope of this application.

In this embodiment, a corresponding device may be divided into function modules based on the foregoing method embodiments. For example, function modules may be obtained through division based on corresponding functions, or two or more functions may be integrated into one processing module. The integrated module may be implemented in a form of hardware. It should be noted that, in this embodiment, division into the modules is an example, and is merely a possible logical function division. During actual implementation, another division manner may be used.

When the division into function modules is used, an apparatus for advertising a processing capability of a network device provided in embodiments of this application is described below with reference to FIG. 7 and FIG. 8.

Figure 6:
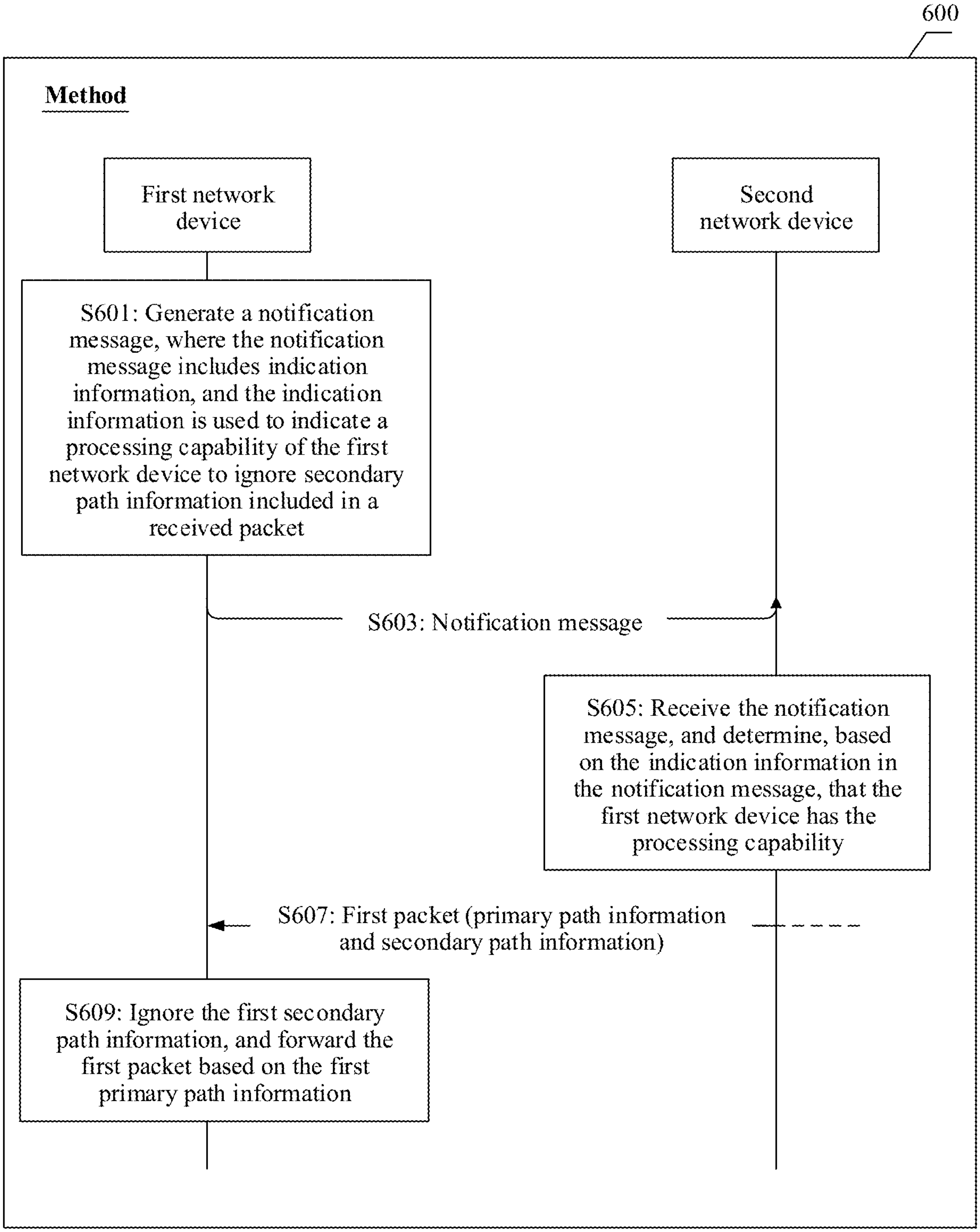
FIG. 6 is a flowchart of another method for advertising a processing capability of a network device according to an embodiment of this application.
Figure 7:
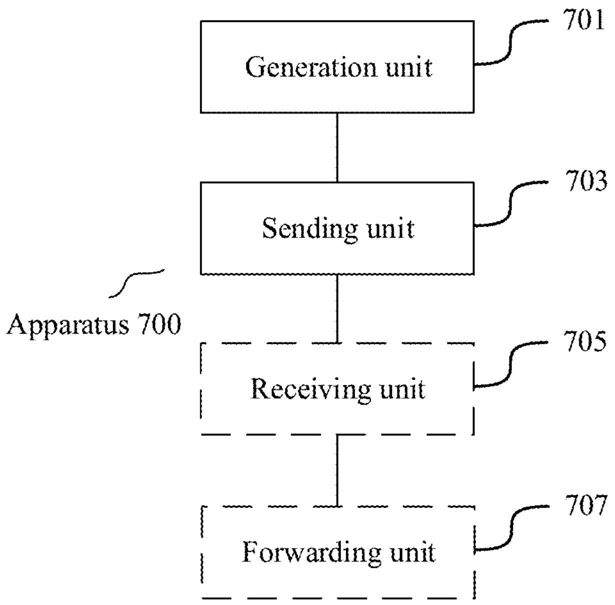
FIG. 7 is a schematic diagram of a structure of an apparatus for advertising a processing capability of a network device according to an embodiment of this application.

FIG. 7 is a block diagram of an apparatus 700 for advertising a processing capability of a network device according to an embodiment of this application. The apparatus 700 may be, for example, the PE 24 or the PE 25 in the system shown in FIG. 1*a*; the PE 24, the PE 25, or the PE 27 in the system shown in FIG. 1*b*; the egress node described in the method in FIG. 4; the forwarding node described in the method in FIG. 5; the first network device described in the method in FIG. 6; or a module or a component in any network device mentioned above, and may implement a corresponding function performed in the method 400, 500, or 600 by any network device mentioned above.

In some embodiments, as shown in FIG. 7, the apparatus 700 for advertising a processing capability of a network device may include a generation unit 701 and a sending unit 703.

The generation unit 701 is configured to generate a advertisement message, where the advertisement message includes first indication information, the first indication information is used to indicate a processing capability of the first network device, the processing capability of the first network device includes a processing capability of ignoring secondary path information when the first network device serves as a network device on a primary path for forwarding a packet and receives the packet including primary path information and the secondary path information, and the secondary path information is used to indicate one or more secondary paths for forwarding the packet when the primary path is unavailable. For a function that can be performed by the generation unit 701, refer to the related descriptions in S401, S501, or S601.

The sending unit 703 is configured to send the advertisement message to a second network device. For a function that can be performed by the sending unit 703, refer to the related descriptions in S403, S503, or S603.

In some embodiments, the apparatus 700 further includes a receiving unit 705 and a forwarding unit 707. The receiving unit 705 is configured to receive a first packet, where the first packet includes first primary path information and first secondary path information, the first primary path information is used to indicate a first primary path for forwarding the first packet, and the first secondary path information is used to indicate one or more first secondary paths for forwarding the first packet when the first primary path is unavailable. The forwarding unit 707 is configured to: ignore the first secondary path information, and forward the first packet based on the first primary path information. For a function that can be performed by the receiving unit 705, refer to the related descriptions in S407, S509, and S607. For a function that can be performed by the forwarding unit 707, refer to the related descriptions in S609.

In some embodiments, the receiving unit 705 is further configured to: receive a BGP message that is not updated, where the BGP message that is not updated includes a second VPN SID label field of a VPN route. The generation unit 701 is further configured to replace the second VPN SID label field with a first VPN SID label field, to generate the BGP message through updating.

In some embodiments, the second VPN SID label field includes second indication information used to indicate a processing capability of a third network device, the processing capability of the third network device includes a processing capability of ignoring the secondary path information included in the packet when the third network device serves as a network device on the primary path for forwarding the packet and receives the packet including the primary path information and the secondary path information, and the third network device is a network device indicated in next hop information carried in the BGP message that is not updated.

In some embodiments, the first indication information is carried in an extended community attribute in the BGP message. The receiving unit 705 is further configured to receive a BGP message that is not updated, where the BGP message that is not updated includes a next hop attribute, where both the first indication information in the extended community attribute and the next hop attribute include first next hop information, and the first next hop information is used to indicate a third network device. The generation unit 701 is further configured to modify the first next hop information in the next hop attribute to second next hop information, where the second next hop information is used to indicate the first network device.

In some embodiments, the generation unit 701 is further configured to modify the first next hop information in the extended community attribute to the second next hop information.

In some embodiments, that the first indication information is used to indicate a processing capability of the first network device includes: the first indication information and the next hop attribute are used to indicate the processing capability of the first network device.

In some embodiments, the first secondary path information includes one or more secondary SIDs, the first primary path information includes a primary SID, and the primary SID is associated with the first network device. The forwarding unit 707 is further configured to: remove the one or more secondary SIDs by matching the primary SID with a SID stored in the first network device; and forward the first packet to a user-side network device based on payload information carried in the first packet, or forward the first packet based on a SID added after the one or more secondary SIDs are removed.

In some embodiments, the first secondary path information includes one or more secondary SIDs, the first primary path information includes a primary SID, and the primary SID is associated with the first network device. The forwarding unit 707 is further configured to: skip the one or more secondary SIDs by matching the primary SID with a SID stored in the first network device, and forward the first packet based on a SID located after the one or more secondary SIDs.

Figure 8:
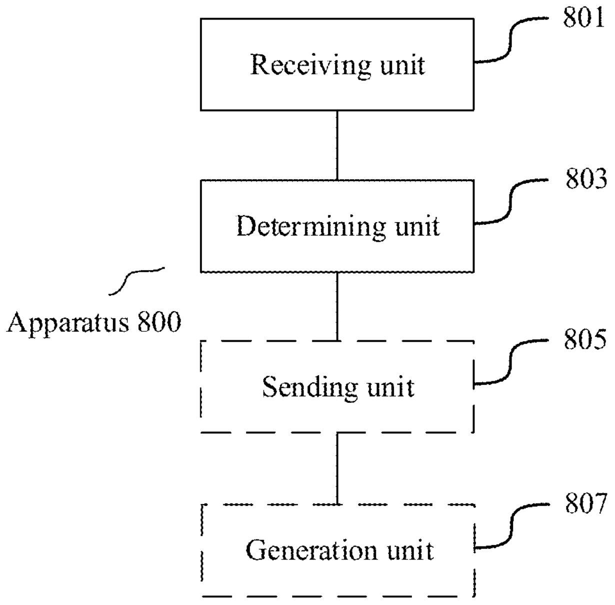
FIG. 8 is a schematic diagram of a structure of another apparatus for advertising a processing capability of a network device according to an embodiment of this application.

FIG. 8 is a block diagram of another apparatus 800 for advertising a processing capability of a network device according to an embodiment of this application. The apparatus 800 may be, for example, the PE 21 in the system shown in FIG. 1*a*; the PE 21, the PE 24, or the PE 25 in the system shown in FIG. 1*b*; the head node described in the method in FIG. 4; the controller described in the method in FIG. 5; the second network device described in the method in FIG. 6; or a module or a component in any network device mentioned above, and may implement a corresponding function performed in the method 400, 500, or 600 by any network device mentioned above.

In some embodiments, as shown in FIG. 8, the apparatus 800 for advertising a processing capability of a network device may include a receiving unit 801 and a determining unit 803. The receiving unit 801 is configured to receive a advertisement message sent by a first network device, where the advertisement message includes first indication information, the first indication information is used to indicate a processing capability of the first network device, the processing capability of the first network device includes a processing capability of ignoring secondary path information when the first network device serves as a network device on a primary path for forwarding a packet and receives the packet including primary path information and the secondary path information, and a secondary path is one or more secondary paths for forwarding the packet when the primary path is unavailable. The determining unit 803 may be configured to: determine, based on the first indication information, that the first network device has the processing capability; or determine, based on the first indication information, that the first network device does not have the processing capability.

In some embodiments, the apparatus 800 may further include a sending unit 805, configured to: send a first packet based on the fact that the first network device has the processing capability, where the first packet carries first secondary path information and first primary path information, the first primary path information is used to indicate a first primary path for forwarding the first packet, and the first secondary path information is used to indicate one or more first secondary paths for forwarding the first packet when the first primary path is unavailable; or send a first message to a third network device based on the fact that the first network device has the processing capability, where the first message is used to indicate the third network device to obtain, based on the first message, first secondary path information and first primary path information that are carried in a first packet, and the first packet is a packet sent by the third network device to the first network device.

In some embodiments, the determining unit 803 is configured to determine, based on the fact that the advertisement message sent by the first network device carries the first indication information, that the first network device has the processing capability.

In some embodiments, it is determined, based on the fact that the first indication information carried in the advertisement message sent by the first network device has a first value, that the first network device has the processing capability.

In some embodiments, the first indication information is carried in a VPN route of a BGP message. The determining unit 803 is configured to determine, based on the fact that the VPN route includes the first indication information, that the first network device has the processing capability.

In some embodiments, the first indication information is carried in an extended community attribute in the BGP message.

In some embodiments, the BGP message further includes a next hop attribute, and the next hop attribute carries next hop information used to indicate the first network device. The determining unit 803 is configured to: determine, based on the fact that the first indication information is the same as the next hop information carried in the next hop attribute, that the first network device has the processing capability; or the determining, based on the first indication information, that the first network device does not have the processing capability includes: determining, based on the fact that the first indication information is different from the next hop information carried in the next hop attribute, that the first network device does not have the processing capability.

In some embodiments, the receiving unit 801 is further configured to receive a advertisement message sent by a third network device, where the advertisement message sent by the fourth network device includes second indication information, the second indication information is used to indicate a processing capability of the fourth network device, the processing capability of the fourth network device includes a processing capability of ignoring the secondary path information included in the packet when the third network device serves as a network device on the primary path for forwarding the packet and receives the packet including the primary path information and the secondary path information, and the secondary path information is used to indicate the one or more secondary paths for forwarding the packet when the primary path is unavailable.

In some embodiments, the advertisement message sent by the first network device further includes first path information, the advertisement message sent by the third network device further includes second path information, and before the first packet or the first message is sent to the first network device, the determining unit 803 is configured to determine, based on the advertisement message sent by the first network device and the advertisement message sent by the fourth network device, that the first network device is a primary device and the fourth network device is a secondary device. The apparatus 800 further includes a generation unit 807, configured to add the first path information and the second path information to generate the first packet, where the first path information belongs to the first primary path information, and the second path information belongs to the first secondary path information. Alternatively, the sending unit 805 is configured to send the first message including the first path information and the second path information to the third network device, to indicate the third network device to include the first path information and the second path information in the first packet, where the first path information belongs to the first primary path information, and the second path information belongs to the first secondary path information.

In some embodiments, the determining unit 803 is further configured to determine, based on the first indication information, that the first network device does not have the processing capability. The sending unit 805 is further configured to send a second packet based on the fact that the first network device does not have the processing capability, where the second packet carries second primary path information but does not carry second secondary path information, the second primary path information is used to indicate a second primary path for forwarding the second packet, and the second secondary path information is used to indicate one or more second secondary paths for forwarding the second packet when the second primary path is unavailable.

An embodiment of this application further provides a network device 900. The network device 900 may be, for example, a network device that may be configured to perform different functions and that is described in each method embodiment described above, for example, any PE device in the system 10 shown in FIG. 1*a*, FIG. 1*b*, or FIG. 2, the apparatus 700 shown in FIG. 7, or the apparatus 800 shown in FIG. 8.

The network device 900 includes various hardware or software modules required to implement the method operations performed by the network device in each method embodiment described above. For detailed procedures of functions that can be performed by the network device 900, refer to the foregoing method embodiments. For brevity, details are not described herein again. The execution processes mentioned in the foregoing method embodiments may be completed by using a hardware integrated logical circuit in a processor of the network device 900 or by using instructions in a form of software, for example, may be directly performed and completed by a hardware processor, or may be performed and completed by using a combination of hardware and software modules in the processor. A software module may be located in a storage medium, such as a random access memory, a flash memory, a read-only memory, a programmable read-only memory, an electrically-erasable programmable memory, or a register. The storage medium is located in the memory, and the processor may read information in the memory and completes the operations of the foregoing method in combination with hardware of the processor.

If the network device 900 corresponds to the apparatus 700 shown in FIG. 7 or the apparatus 800 shown in FIG. 8, each function module in the apparatus 700 or the apparatus 800 may be implemented by using software, hardware, or a combination of software and hardware of the network device 900. A function executed by a function module implemented by the apparatus 700 or the apparatus 800 in a form of software may be executed by the network device 900 after the processor of the network device 900 reads program code stored in the memory.

Figure 9:
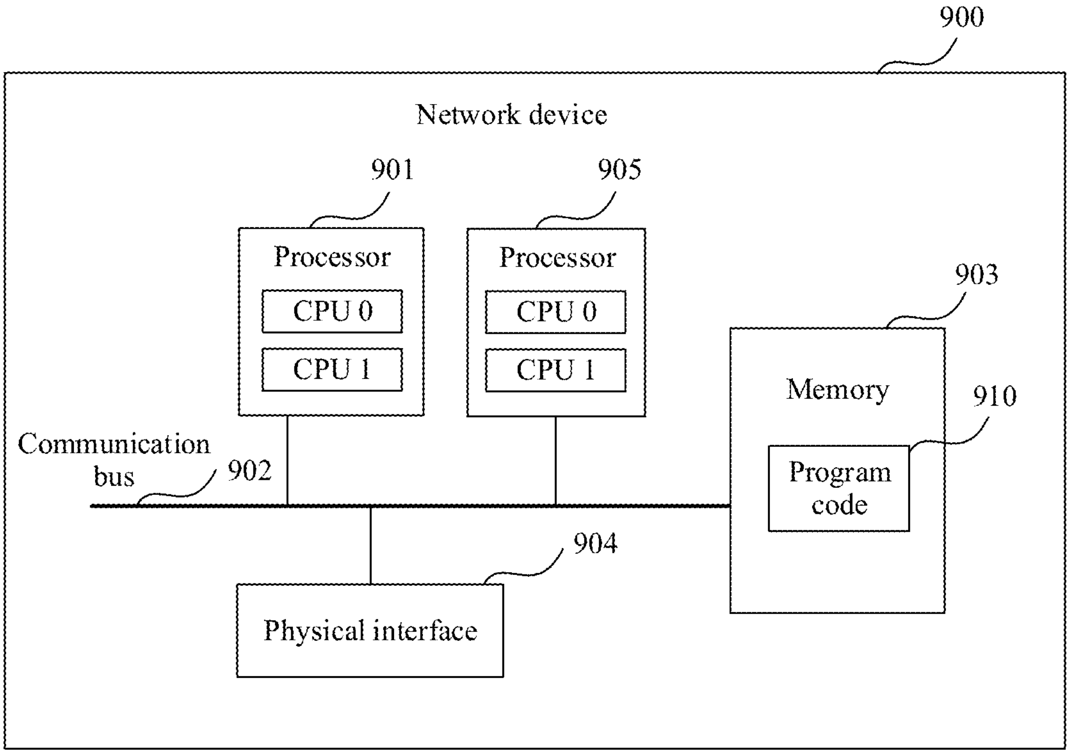
FIG. 9 is a schematic diagram of a structure of a network device according to an embodiment of this application.

FIG. 9 is a schematic diagram of a structure of an example of a network device 900 according to an embodiment of this application. The network device 900 includes at least one processor 901, a communication bus 902, a memory 903, and at least one physical interface 909.

The processor 901 may be a general-purpose central processing unit (CPU), a network processor (NP), or a microprocessor, or may be one or more integrated circuits configured to implement the solutions of this application, for example, an application-specific integrated circuit (ASIC), a programmable logic device (PLD), or a combination thereof. The PLD may be a complex programmable logic device (CPLD), a field-programmable logic gate array (FPGA), generic array logic (GAL), or any combination thereof.

The communication bus 902 is configured to transfer information between the foregoing components. The communication bus 902 may be classified into an address bus, a data bus, a control bus, and the like. For ease of indication, the bus is indicated by using only one bold line in the figure. However, it does not indicate that there is only one bus or only one type of bus.

The memory 903 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer, but is not limited thereto. The memory 903 may exist independently, and is connected to the processor 901 by using the communication bus 902. The memory 903 may also be integrated with the processor 901.

The physical interface 909 is configured to communicate with another device or a communication network by using any apparatus such as a transceiver. The physical interface 909 includes a wired communication interface, and may further include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular network communication interface, a combination thereof, or the like. The physical interface 909 is also referred to as a physical port. There may be one or more physical interfaces 909.

In some embodiments, the processor 901 may include one or more CPUs, for example, a CPU 0 and a CPU 1 in FIG. 9.

In some embodiments, the network device 900 may include a plurality of processors, for example, the processor 901 and a processor 905 shown in FIG. 9. Each of the processors may be a single-core processor (single-CPU) or a multi-core processor (multi-CPU). The processor herein may be one or more devices, circuits, and/or processing cores configured to process data (for example, computer program instructions).

In some embodiments, the network device 900 may further include an output device 906 and an input device 907. The output device 906 communicates with the processor 901, and may display information in a plurality of manners. For example, the output device 906 may be a liquid crystal display (LCD), a light emitting diode (LED) display device, a cathode ray tube (CRT) display device, or a projector. The input device 907 communicates with the processor 901, and may receive a user input in a plurality of manners. For example, the input device 907 may be a mouse, a keyboard, a touchscreen device, a sensing device, or the like.

In some embodiments, the memory 903 is configured to store program code 910 for performing the solutions of this application, and the processor 901 may execute the program code 910 stored in the memory 903, to implement a corresponding function. For example, a program stored in the program code 910 may be invoked to implement a function of the generation unit 701 in the apparatus 700, or may be invoked to implement functions of the determining unit 803 and the generation unit 809 in the apparatus 800. That is, the network device 900 may cooperate with the processor 901 and the program code 910 in the memory 903 to implement the method procedures provided in the foregoing method embodiments. In this case, for example, the generation unit 701 and the determining unit 803 may be equivalent to the processor 901 in the network device 900, and the sending unit 703 or the receiving unit 705 is equivalent to the physical interface 909 in the network device 900.

FIG. 9 shows a possible example of a composition structure of the network device. The network device may also use another composition structure. For example, the network device includes at least a processor, and a memory configured to store program code may be independent of the network device. For example, the memory may be storage space on a cloud server or a network hard disk. In addition, there may be one or more memories. When there are a plurality of memories, the plurality of memories may be located at a same location or different locations, and may be used independently or in cooperation.

Figure 10:
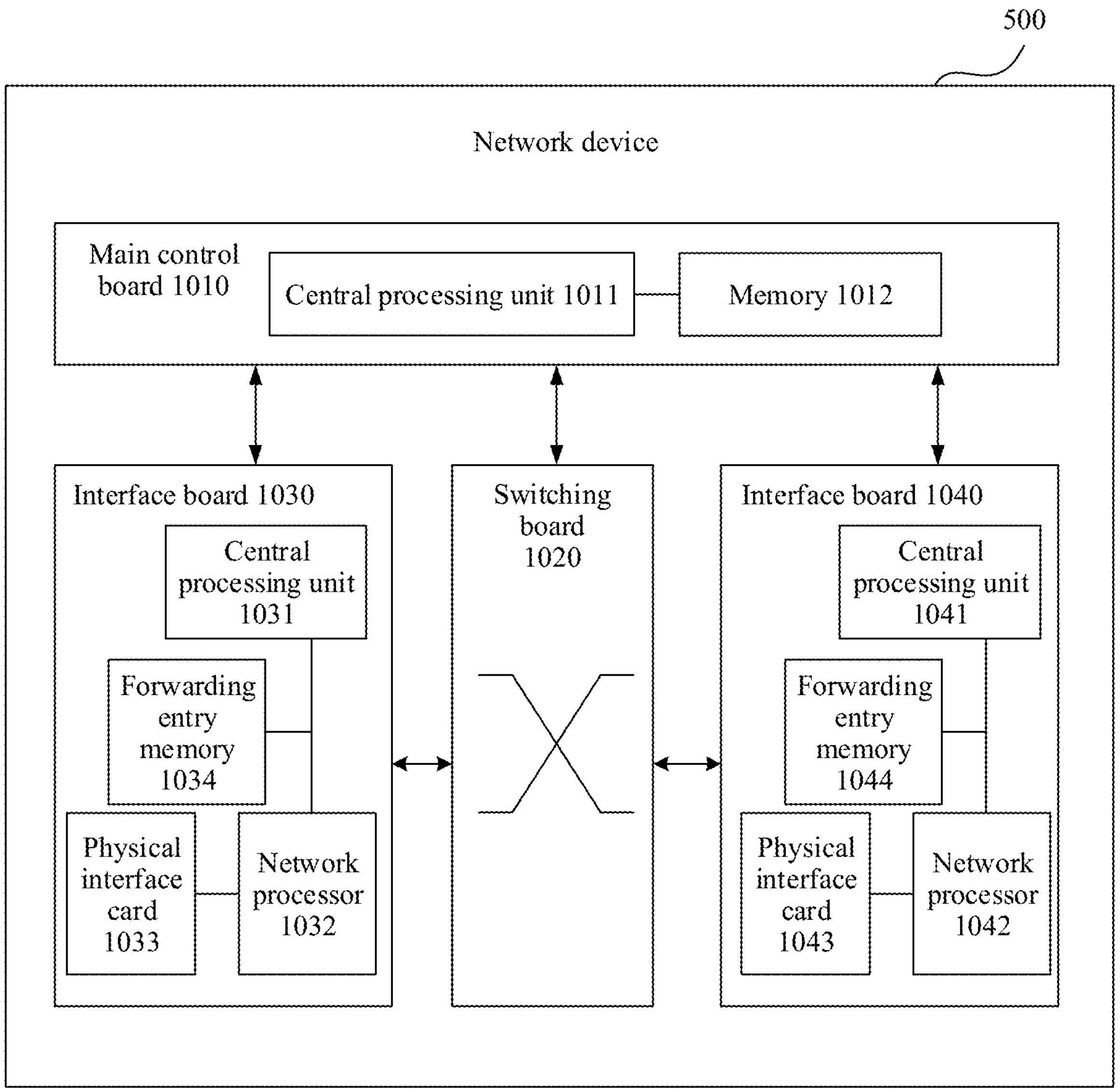
FIG. 10 is a schematic diagram of a structure of a network device according to an embodiment of this application.

FIG. 10 is a schematic diagram of a structure of another network device according to an embodiment of this application. The network device 1000 may be, for example, a network device that may be configured to perform different functions and that is described in each method embodiment described above, for example, any PE device in the system 10 shown in FIG. 1*a*, FIG. 1*b*, or FIG. 2, the apparatus 700 shown in FIG. 7, or the apparatus 800 shown in FIG. 8.

The network device 1000 includes a main control board 1010 and an interface board 1030.

The main control board 1010 is also referred to as a main processing unit (MPU) or a route processor card. The main control board 1010 performs control and management on components of the network device 1000, including functions of route calculation, device management, device maintenance, and protocol processing. The main control board 1010 includes a central processing unit 1011 and a memory 1012.

The interface board 1030 is also referred to as a line processing unit (LPU), a line card, or a service board. The interface board 1030 is configured to provide various service interfaces and forward a data packet. The service interface includes but is not limited to an Ethernet interface, a POS (Packet over SONET/SDH) interface, and the like. The Ethernet interface is, for example, a Flexible Ethernet Client (FlexE Clients). The interface board 1030 includes a central processing unit 1031, a network processor 1032, a forwarding entry memory 1034, and a physical interface card (PIC) 1033.

The central processing unit 1031 on the interface board 1030 is configured to: control and manage the interface board 1030, and communicate with the central processing unit 1011 on the main control board 1010.

The network processor 1032 is configured to forward and process a packet. A form of the network processor 1032 may be a forwarding chip. In some embodiments, processing on an uplink packet includes processing at a packet ingress interface and searching on a forwarding table, and processing on a downlink packet includes searching on the forwarding table and the like.

The physical interface card 1033 is configured to implement a physical-layer interconnection function. Original traffic enters the interface board 1030 from the physical interface card 1033, and a processed packet is sent from the physical interface card 1033. The physical interface card 1033 includes at least one physical interface. The physical interface is also referred to as a physical port. The physical interface card 1033 is also referred to as a subcard, may be mounted on the interface board 1030, and is responsible for converting an optoelectronic signal into a packet, performing validity check on the packet, and forwarding the packet to the network processor 1032 for processing. In some embodiments, the central processing unit 1031 on the interface board 1003 may also perform a function of the network processor 1032, for example, implementing software forwarding based on a general-purpose CPU, so that the network processor 1032 is not required in the physical interface card 1033.

In some embodiments, the network device 1000 includes a plurality of interface boards. For example, the network device 1000 further includes an interface board 1040, and the interface board 1040 includes a central processing unit 1041, a network processor 1042, a forwarding entry memory 1044, and a physical interface card 1043.

In some embodiments, the network device 1000 further includes a switching board 1020. The switching board 1020 may also be referred to as a switch fabric unit (SFU). When the network device has a plurality of interface boards 1030, the switching board 1020 is configured to complete data exchange between the interface boards. For example, the interface board 1030 and the interface board 1040 may communicate with each other by using the switching board 1020.

The main control board 1010 is coupled to the interface board 1030. For example, the main control board 1010, the interface board 1030, the interface board 1040, and the switching board 1020 are connected to a system backplane by using a system bus to implement interworking. In some embodiments, an inter-process communication protocol (IPC) channel is established between the main control board 1010 and the interface board 1030, and communication is performed between the main control board 1010 and the interface board 1030 through the IPC channel.

Logically, the network device 1000 includes a control plane and a forwarding plane. The control plane includes the main control board 1010 and the central processing unit 1031. The forwarding plane includes components that perform forwarding, such as the forwarding entry memory 1034, the physical interface card 1033, and the network processor 1032. The control plane performs the following functions: a router, generating a forwarding table, processing signaling and a protocol packet, configuring and maintaining a device status, or the like. The control plane delivers the generated forwarding table to the forwarding plane. On the forwarding plane, the network processor 1032 searches the forwarding table delivered by the control plane, and forwards, based on the table, a packet received by the physical interface card 1033. The forwarding table delivered by the control plane may be stored in the forwarding entry memory 1034. In some embodiments, the control plane and the forwarding plane may be totally separated, and are not on a same device.

As the network device 1000 configured to perform the foregoing method embodiments, the central processing unit 1011 may be configured to perform an operation such as generating an advertisement message, or determining, based on indication information carried in the advertisement message, a processing capability of a network device that sends the advertisement message. The network processor 1032 may trigger the physical interface card 1033 to forward a traffic packet to another network device.

For example, the apparatus 700 is used as an example. The sending unit 703 or the receiving unit 705 in the apparatus 700 may be equivalent to the physical interface card 1033 or the physical interface card 1043 in the network device 1000. The generation unit 701 in the apparatus 700 may be equivalent to the central processing unit 1011 or the central processing unit 1031 in the network device 1000.

It should be understood that in this embodiment of this application, an operation on the interface board 1040 is the same as an operation on the interface board 1030. For brevity, details are not described again. The main control board 1010, and the interface board 1030 and/or the interface board 1040 in the network device 1000 may implement the functions and/or the operations implemented by the network devices in the foregoing method embodiments. For brevity, details are not described herein.

It should be understood that there may be one or more main control boards. When there are a plurality of main control boards, the main control boards may include a primary main control board and a secondary main control board. There may be one or more interface boards; and a network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data of an entire system. In a distributed forwarding architecture, the network device may have at least one switching board, and data exchange between a plurality of interface boards is implemented by using the switching board, to provide a large-capacity data exchange and processing capability. Therefore, a data access and processing capability of the network device in the distributed architecture is better than that of the device in the centralized architecture. In some embodiments, the network device may alternatively be in a form in which there is only one card. In some embodiments, there is no switching board, and functions of the interface board and the main control board are integrated on the card. In this case, the central processing unit on the interface board and the central processing unit on the main control board may be combined to form one central processing unit on the card, to perform functions obtained by combining the two central processing units. This form of device (for example, a network device such as a low-end switch or a router) has a weak data exchange and processing capability. An architecture that is to be used depends on a networking deployment scenario. This is not limited herein.

In some possible embodiments, the network device may be implemented as a virtualized device. For example, the virtualized device may be a virtual machine (VM) on which a program having a packet sending function is run, and the virtual machine is deployed on a hardware device (for example, a physical server). The virtual machine is a complete software-simulated computer system that has complete hardware system functions and that runs in an entirely isolated environment. The virtual machine may be configured as the network device. For example, the network device may be implemented based on a general-purpose physical server in combination with a network functions virtualization (NFV) technology. The network device is a virtual host, a virtual router, or a virtual switch. By reading this application, a person skilled in the art may obtain, on the general-purpose physical server through virtualization with reference to the NFV technology, the network device having the foregoing functions. Details are not described herein.

It should be understood that the network devices in the foregoing product forms separately have any function of the network device in the foregoing method embodiments. Details are not described herein.

An embodiment of this application provides a computer program product. When the computer program product is run on a network device, the network device is enabled to perform the method provided in any one of the foregoing method embodiments.

An embodiment of this application further provides a chip system, including a processor and an interface circuit. The interface circuit is configured to receive instructions and transmit the instructions to the processor. The processor may be configured to execute the instructions, to enable a network device to perform the method provided in embodiments of this application. The processor is coupled to a memory, and the memory is configured to store a program or the instructions. When the program or the instructions are executed by the processor, the chip system is enabled to implement the method in any one of the foregoing method embodiments.

In some embodiments, there may be one or more processors in the chip system. The processor may be implemented by hardware, or may be implemented by software. When the processor is implemented by the hardware, the processor may be a logic circuit, an integrated circuit, or the like. When the processor is implemented by the software, the processor may be a general-purpose processor, and is implemented by reading software code stored in the memory.

In some embodiments, there may also be one or more memories in the chip system. The memory may be integrated with the processor, or may be disposed separately from the processor. This is not limited in this application. For example, the memory may be a non-transitory processor such a read-only memory ROM. The memory and the processor may be integrated into a same chip, or may be separately disposed on different chips. A type of the memory and a manner of disposing the memory and the processor are not limited in this application.

For example, the chip system may be a field programmable gate array (FPGA), an application-specific integrated chip (ASIC), a system on a chip (SoC), a CPU, an NP, a digital signal processing circuit (DSP), a micro controller unit (MCU), a programmable controller (PLD), or another integrated chip.

All of the foregoing technical solutions may form other embodiments of this disclosure through any combination. Details are not described herein again.

A person of ordinary skill in the art may understand that all or some of the operations of the foregoing embodiments may be implemented by hardware or a program instructing related hardware. The program may be stored in a computer-readable storage medium. The storage medium may be a read-only memory, a magnetic disk, an optical disc, or the like.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A first network device, comprising:

at least one processor;

one or more memories coupled to the at least one processor and storing programming instructions, wherein the at least one processor is configured to execute the programming instructions to cause the first network device to:

generate an advertisement message, wherein the advertisement message comprises first indication information that is used to indicate a processing capability of the first network device, the processing capability of the first network device comprises a processing capability of ignoring secondary path information when the first network device serves on a primary path for forwarding a packet and receives the packet comprising primary path information and the secondary path information, and the secondary path information is used to indicate one or more secondary paths for forwarding the packet when the primary path is unavailable;

send the advertisement message to a second network device;

receive a first packet comprising first primary path information and first secondary path information; and ignore the first secondary path information and forward the first packet based on the first primary path information.

2. The first network device according to claim 1, wherein the first primary path information is used to indicate a first primary path for forwarding the first packet, and the first secondary path information is used to indicate one or more first secondary paths for forwarding the first packet when the first primary path is unavailable.

3. The first network device according to claim 1, wherein the advertisement message is a border gateway protocol (BGP) message or an interior gateway protocol (IGP) message.

4. The first network device according to claim 3, wherein the first indication information is carried in a private route or a public route comprised in the BGP message, and the private route or the public route is a route for forwarding a service to which the packet belongs, or the first indication information is carried in an extended community attribute in the BGP message.

5. The first network device according to claim 1, wherein the secondary path information comprises one or more secondary segment identifiers (SIDs), and the one or more secondary SIDs are allocated by one or more network devices having a multi-homing relationship with the first network device.

6. The first network device according to claim 2, wherein the first secondary path information comprises one or more secondary segment identifiers (SIDs), the first primary path information comprises a primary SID that is associated with the first network device, and wherein the at least one processor is further configured to execute the programming instructions to cause the first network device to:

remove the one or more secondary SIDs by matching the primary SID with a SID stored in the first network device; and forward the first packet to a user-side network device based on payload information carried in the first packet, or forwarding the first packet based on the SID added after the one or more secondary SIDs are removed.

7. The first network device according to claim 2, wherein the first secondary path information comprises one or more secondary segment identifiers (SIDs), the first primary path information comprises a primary SID that is associated with the first network device, and wherein the at least one processor is further configured to execute the programming instructions to cause the first network device to:

skip the one or more secondary SIDs by matching the primary SID with a SID stored in the first network device, and forwarding the first packet based on the SID located after the one or more secondary SIDs.

8. The first network device according to claim 3, wherein the first network device is an intermediate network device or an egress network device that bears a service, and the first indication information is carried in the IGP message or the BGP message for advertising a link state.

9. The first network device according to claim 1, wherein the second network device is a controller or an ingress network device.

10. A second network device, comprising:
at least one processor;
one or more memories coupled to the at least one processor and storing programming instructions, wherein the at least one processor is configured to execute the programming instructions to cause the second network device to:
receive an advertisement message sent by a first network device, wherein the advertisement message comprises first indication information that is used to indicate a processing capability of the first network device, the processing capability of the first network device comprises a processing capability of ignoring secondary path information comprised in a packet when the first network device serves as a network device on a primary path for forwarding the packet and receives the packet comprising primary path information and the secondary path information, and the secondary path information is used to indicate one or more secondary paths for forwarding the packet when the primary path is unavailable;
determine, based on the first indication information, that the first network device has the processing capability; or determining, based on the first indication information, that the first network device does not have the processing capability; and
send, based on determining the first network device has the processing capability, a first packet comprising first primary path information and first secondary path information; or send a first message to a third network device based on determining that the first network device has the processing capability.

11. The second network device according to claim 10, wherein
the first primary path information is used to indicate a first primary path for forwarding the first packet, and the first secondary path information is used to indicate one or more first secondary paths for forwarding the first packet when the first primary path is unavailable; or
the first message is used to indicate the third network device to obtain, based on the first message, the first secondary path information and the first primary path information that are carried in the first packet, and the first packet is sent by the third network device to the first network device.

12. The second network device according to claim 10, wherein the at least one processor is further configured to execute the programming instructions to cause the second network device to:
send a second packet based on determining that the first network device does not have the processing capability, wherein the second packet carries second primary path information but does not carry second secondary path information, the second primary path information is used to indicate a second primary path for forwarding the second packet, and the second secondary path information is used to indicate one or more second secondary paths for forwarding the second packet when the second primary path is unavailable.

13. A network system comprising a first network device and a second network device,
wherein the first network device is configured to:
generate an advertisement message, wherein the advertisement message comprises first indication information that is used to indicate a processing capability of the first network device, the processing capability of the first network device comprises a processing capability of ignoring secondary path information when the first network device serves as a network device on a primary path for forwarding a packet and receives the packet comprising primary path information and the secondary path information, and the secondary path information is used to indicate one or more secondary paths for forwarding the packet when the primary path is unavailable;
send the advertisement message to the second network device;
wherein the second network device is configured to:
receive the advertisement message sent by the first network device; and
determine, based on the first indication information, that the first network device has the processing capability; or
determine, based on the first indication information, that the first network device does not have the processing capability;
receive a first packet comprising first primary path information and first secondary path information; and
ignore the first secondary path information and forward the first packet based on the first primary path information.

14. The network system according to claim 13, wherein
the first primary path information is used to indicate a first primary path for forwarding the first packet, and
the first secondary path information is used to indicate one or more first secondary paths for forwarding the first packet when the first primary path is unavailable.

15. The network system according to claim 13, wherein the second network device is further configured to:
send a first packet based on determining that the first network device has the processing capability, wherein the first packet carries first secondary path information and first primary path information, the first primary path information is used to indicate a first primary path for forwarding the first packet, and the first secondary path information is used to indicate one or more first secondary paths for forwarding the first packet when the first primary path is unavailable; or
send a first message to a third network device based on determining that the first network device has the processing capability, wherein the first message is used to indicate the third network device to obtain, based on the first message, the first secondary path information and the first primary path information that are carried in the first packet, and the first packet is sent by the third network device to the first network device.

16. The network system according to claim 13, wherein the advertisement message is a border gateway protocol (BGP) message or an interior gateway protocol (IGP) message.

17. The network system according to claim 16, wherein the first indication information is carried in a private route or a public route comprised in the BGP message, and a Virtual Private Network VPN route or the public route is a route for forwarding a service to which the packet belongs, or the first indication information is carried in an extended community attribute in the BGP message.

18. The network system according to claim 13, wherein the secondary path information comprises one or more secondary segment identifiers (SIDs), and the one or more secondary SIDs are SIDs allocated by one or more network devices having a multi-homing relationship with the first network device.

19. The network system according to claim 16, wherein the first network device is an intermediate network device or an egress network device that bears a service, and the first indication information is carried in the IGP message or the BGP message for advertising a link state.

20. The network system according to claim 13, wherein the second network device is a controller or an ingress network device.

* * * * *